(12) United States Patent
Nunokawa et al.

(10) Patent No.: US 8,335,051 B2
(45) Date of Patent: Dec. 18, 2012

(54) PERPENDICULAR MAGNETIC RECORDING HEAD HAVING A MAGNETIC LAYER OVERHANGING A TRAILING SIDE OF A MAIN POLE AND METHOD OF MANUFACTURE THEREOF

(75) Inventors: Isao Nunokawa, Kanagawa (JP); Mikito Sugiyama, Kanagawa (JP); Kikuo Kusukawa, Saitama (JP); Kimitoshi Etoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 403 days.

(21) Appl. No.: 12/636,667

(22) Filed: Dec. 11, 2009

(65) Prior Publication Data

US 2010/0149697 A1    Jun. 17, 2010

(30) Foreign Application Priority Data

Dec. 16, 2008  (JP) ................................ 2008-319571

(51) Int. Cl.
*G11B 5/187* (2006.01)
*G11B 5/147* (2006.01)

(52) U.S. Cl. ......... 360/125.06; 360/125.09; 360/125.11; 360/125.12; 360/125.3; 29/603.14

(58) Field of Classification Search ............ 360/125.03, 360/125.06, 125.09, 125.11, 125.12, 125.15, 360/125.3; 29/603.14, 603.15, 603.16
See application file for complete search history.

(56) References Cited

U.S. PATENT DOCUMENTS

| 2007/0188921 | A1 | 8/2007 | Mochizuki et al. | 360/126 |
|---|---|---|---|---|
| 2007/0211380 | A1 | 9/2007 | Akimoto et al. | 360/126 |
| 2007/0211382 | A1 | 9/2007 | Mochizuki et al. | 360/126 |
| 2008/0232001 | A1* | 9/2008 | Bonhote et al. | 360/319 |
| 2010/0091413 | A1* | 4/2010 | Nunokawa et al. | 360/319 |
| 2010/0128392 | A1* | 5/2010 | Bonhote et al. | 360/125.03 |
| 2010/0165513 | A1* | 7/2010 | Bonhote et al. | 360/244 |
| 2011/0304939 | A1* | 12/2011 | Hirata et al. | 360/110 |

FOREIGN PATENT DOCUMENTS

| JP | 2007-220208 | 8/2007 |
|---|---|---|
| JP | 2007-220209 | 8/2007 |
| JP | 2007-242132 | 9/2007 |

\* cited by examiner

*Primary Examiner* — Jefferson Evans
(74) *Attorney, Agent, or Firm* — Zilka-Kotab, PC

(57) ABSTRACT

A recording head having a narrowed track has a high recording magnetic field strength and a high recording magnetic field gradient has certain problems which may be difficult to overcome. In one embodiment, a magnetic film, which overhangs from a track width, is provided on a trailing side of a region retracted from an ABS of a main pole facing a recording medium. Thereby, a magnetic field strength on the trailing side is increased so that a difference in distribution of magnetic field strength defined by a geometrical bevel angle given to the main pole is increased. Consequently, writing performance of the main pole is improved while forming a large magnetic clearance angle with respect to an adjacent track and suppresses writing into an adjacent track when skew occurs. Other systems and methods are also disclosed regarding a head with a high recording magnetic field using an overhanging magnetic film.

17 Claims, 26 Drawing Sheets

(a)

(b)

(a)

(b)

(a)

(b)

(a)

(b)

(a)

(b)

(a)

(b)

(a)

(b)

(a)

(b)

(c)

PERPENDICULAR MAGNETIC RECORDING HEAD HAVING A MAGNETIC LAYER OVERHANGING A TRAILING SIDE OF A MAIN POLE AND METHOD OF MANUFACTURE THEREOF

RELATED APPLICATIONS

The present application claims priority to a Japanese Patent Application filed Dec. 16, 2008, under Appl. No. 2008-319571, which is incorporated herein by reference.

FIELD OF THE INVENTION

The present invention relates to magnetic recording/reproducing, and more particularly to a magnetic head that includes an overhanging layer on a trailing side that generates a recording magnetic field on a magnetic recording medium.

BACKGROUND OF THE INVENTION

Current industry trends have increased demand for magnetic recording devices which have the ability to record data with high in-plane recording density along with a reduction in size of each magnetic fine-particle of a magnetic recording medium. In addition, a reduction in the size of the writing pole has been demanded in order to increase the amount of recording information which can be put into magnetic recording mediums. However, reduction in the size of each magnetic fine-particle results in a decrease in the total volume of the magnetic fine-particles; consequently, a thermal fluctuation of magnetization has been problematically caused as a factor of destabilization in a magnetization area of the magnetic recording medium. As a method for solving the problem, a perpendicular magnetic recording method has been proposed, in which a magnetization signal is recorded in a direction perpendicular to a recording medium while increasing the volume of the magnetic fine-particles by increasing a thickness of a recording layer. A main pole of a magnetic recording head used in perpendicular magnetic recording has an inverted trapezoidal profile that is large in width on a trailing side, and small in width on a leading side with respect to a running direction of the magnetic recording medium, so that a difference is given between an amount of magnetic flux emitted from the trailing side of the main pole and an amount of magnetic flux emitted from the leading side thereof due to a Bevel angle (slope angle formed by two different widths, width on a trailing side of a throat height of the main pole and width on a leading side thereof), Thereby, the main pole has a magnetic clearance angle for preventing attenuation and erasing of information data on an adjacent track when information is written into a magnetic recording medium. Even in the perpendicular magnetic recording method, a single pole portion for writing, which generates a perpendicular recording magnetic-field to a magnetic recording medium, is currently reduced in width to increase surface recording density. Consequently, it is now increasingly difficult to generate an adequate perpendicular magnetic field for reversal of magnetization of a magnetic recording medium.

Current industry trends have increased demand for magnetic recording devices which have the ability to record data with high in-plane recording density along with a reduction in size of each magnetic fine-particle of a magnetic recording medium. In addition, a reduction in the size of the writing pole has been demanded in order to increase the amount of recording information which can be put into magnetic recording mediums. However, reduction in the size of each magnetic fine-particle results in a decrease in the total volume of the magnetic fine-particles; consequently, a thennal fluctuation of magnetization has been problematically caused as a factor of destabilization in a magnetization area of the magnetic recording medium. As a method for solving the problem, a perpendicular magnetic recording method has been proposed, in which a magnetization signal is recorded in a direction perpendicular to a recording medium while increasing the volume of the magnetic fine-particles by increasing a thickness of a recording layer. A main pole of a magnetic recording head used in perpendicular magnetic recording has an inverted trapezoidal profile that is large in width on a trailing side, and small in width on a leading side with respect to a running direction of the magnetic recording medium, so that a difference is given between an amount of magnetic flux emitted from the trailing side of the main pole and an amount of magnetic flux emitted from the leading side thereof due to a bevel angle (slope angle formed by two different widths, width on a trailing side of a throat height of the main pole and width on a leading side thereof), Thereby, the main pole has a magnetic clearance angle for preventing attenuation and erasing of information data on an adjacent track when information is written into a magnetic recording medium. Even in the perpendicular magnetic recording method, a. single pole portion for writing, which generates a perpendicular recording magnetic-field to a magnetic recording medium, is currently reduced in width to increase surface recording density. Consequently, it is now increasingly difficult to generate an adequate perpendicular magnetic field for reversal of magnetization of a magnetic recording medium.

Furthermore, when a suspension arm fixed with a slider mounted with a magnetic head is scanned from an inner side to an outer side of a magnetic recording medium for recording and reproducing, an angle of the magnetic head varies depending on a position of a recording/reproducing track of the magnetic recording medium. Such an angle is a so-called skew angle. When a magnetic head has a skew angle, since the main pole of the recording head also has the same angle, data on an adjacent track are attenuated and erased regardless of which track of the magnetic recording medium the magnetic head is positioned on. Therefore, it is essential for achieving high recording density that a high magnetic field is emitted to a recording layer of a magnetic recording medium while securing a certain magnetic clearance angle.

Thus, a method is given to obtain an adequate magnetic clearance angle, where thickness of a main pole is reduced, or a bevel angle of the main pole is increased. However, this reduces a magnetic-flux emitting area of an ABS of the main pole, leading to a reduction in magnetic field strength.

As a measure for this, a method is described in each of Japanese Patent Office (JPO) Pub. Nos. JP-A-2007-220208, JP-A-2007-220209 and JP-A-2007-242132, in which a main pole profile is formed into a T-shape. Thereby, a certain magnetic field strength is secured while a geometric width of a writing track is defined by a wide region, so that a certain magnetic clearance angle is secured on a magnetic recording medium side.

To achieve high in-plane recording density, in one approach, a size of each magnetic particle of a magnetic recording medium is reduced. In addition, a width of a recording/reproducing track of a magnetic head can be reduced. Reduction in a width of a single pole for writing of a recording head causes a decrease in an area of a main pole in an ABS, leading to a reduction in a writing field strength being proportional to a magnetic-pole area. Moreover, a certain magnetic clearance angle is secured to prevent attenuation and erasing of information written into an adjacent track even if a magnetic head has a skew angle.

FIG. 23 is a conceptual view showing a position of a magnetic recording head with respect to a magnetic recording medium. FIG. 23 shows a structure where a slider is fixed to a suspension arm and is moved in an outer circumferential direction of a magnetic recording head 11, and the head has a skew angle. When the main pole is a rectangular main-pole 1a on a track C, which has no bevel angle, distribution of a magnetic field strength for reversal of magnetization in a recording layer of the magnetic recording medium spreads along each side face of a writing pole, and is decreased in width with an increase in distance from a leading side of the main pole. Therefore, a writing magnetic field on the leading side is applied to part of an adjacent track B, leading to attenuation and erasing of information written into the track B.

However, in the case of a main-pole 1a on a track A, which has a bevel angle and thus has an inverted trapezoidal profile, while distribution of a magnetic field strength spreads along a writing pole, since the bevel angle allows formation of a magnetic clearance angle (angle of a contour line, of which the recording field strength of a main pole corresponds to a coercive force of a recording medium, in a leading side direction from a widest point in a track direction on the contour line) with respect to an adjacent track, information can be recorded without affecting the adjacent track. From this, it is known that the bevel angle of the main pole has a great role in performance of the head. However, since track width is reduced with an increase in a recording density, the bevel angle is problematically hardly formed. Moreover, an area of a main pole in an ABS is reduced due to a reduction in width of the main pole, leading to a problem of a reduction in writing field strength.

Therefore, it would be beneficial to have a magnetic head which could overcome these problems associated with current head designs.

SUMMARY OF THE INVENTION

In one embodiment, a magnetic recording head includes a main pole having a throat height portion that defines a recording track width by a surface facing a recording medium, and a flare portion that is integrally formed with the throat height portion and gradually increases in width in an element height direction. The head also includes magnetic shields disposed via a nonmagnetic layer on a trailing side of the main pole and on both sides in a track width direction of the main pole and a magnetic film formed on a throat height portion near the rear in the element height direction with respect to an ABS and formed on the flare portion which overhangs in a track width direction on the trailing side of the main pole.

According to another embodiment, a method of manufacturing a magnetic recording head includes forming a first inorganic insulating film on a substrate, the first inorganic layer having a flattened top so that a top of a yoke portion of a main pole is exposed, the main pole having a throat height portion that defines a recording track width by a facing surface facing a recording medium and a flare portion that is integrally formed with the throat height portion and gradually increased in width in an element height direction; forming a step in the inorganic insulating film; forming a second inorganic insulating film on the stepped first inorganic insulating film; etching the second inorganic insulating film to form a rectangular pedestal for cutting a groove; sequentially depositing an electrode layer for forming magnetic side shields disposed on both sides of the main pole in a track width direction of the main pole; sequentially depositing a protective film for protecting each side face of the rectangular pedestal on each side face of the rectangular pedestal; coating organic resin over each surface; etching the organic resin until the rectangular pedestal is exposed; forming a groove having an inverted trapezoidal profile in the rectangular pedestal; expanding the groove in the rectangular pedestal; filling the groove in the rectangular pedestal with a magnetic plating film; removing any extraneous magnetic plating film above the groove; removing the protective film on each side face of the rectangular pedestal to expose the electrode layer for forming each magnetic side shield layer; forming each magnetic side shield layer by magnetic plating; flattening the magnetic plating; depositing an inorganic insulating film on a substrate, which is flattened so that surfaces of respective regions are exposed; forming a resist pattern on the inorganic insulating film; etching the inorganic insulating film, each magnetic side shield layer, the rectangular pedestal, and the magnetic layer in the groove with the resist pattern as a mask; depositing an electrode layer for forming a trailing magnetic shield on a trailing side of the main pole; and forming a magnetic plating layer for forming the trailing magnetic shield which overhangs in a track width direction on the trailing side of the main pole and on a throat height portion at a back of the main pole in the element height direction with respect to an ABS.

Any of these embodiments may be implemented in a magnetic data storage system such as a disk drive system, which may include a magnetic head, a drive mechanism for passing a magnetic medium (e.g., hard disk) over the head, and a controller electrically coupled to the head.

Other aspects and advantages of the present invention will become apparent from the following detailed description, which, when taken in conjunction with the drawings, illustrate by way of example the principles of the invention.

DETAILED DESCRIPTION

Figure 1:
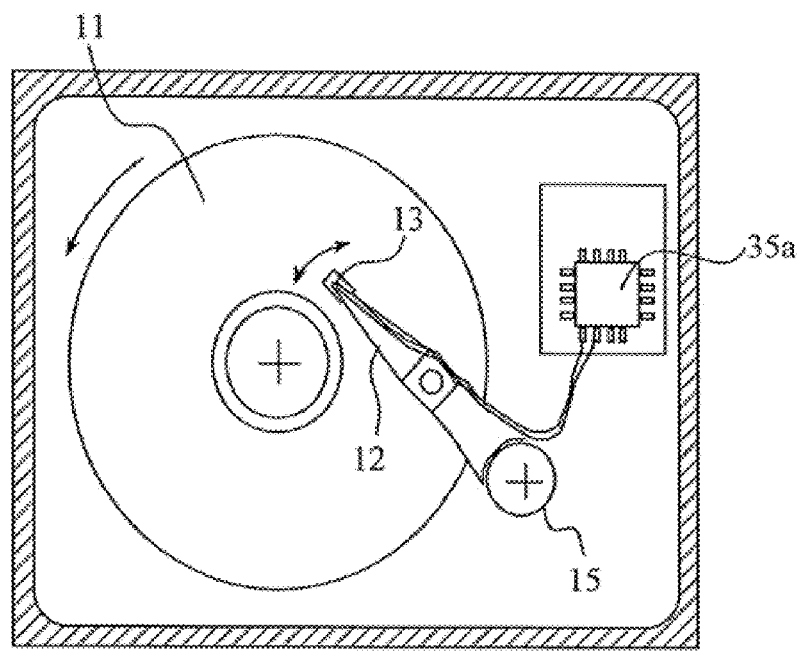
FIG. 1 is a conceptual view of a magnetic recording/reproducing device, according to one embodiment.
Figure 1:
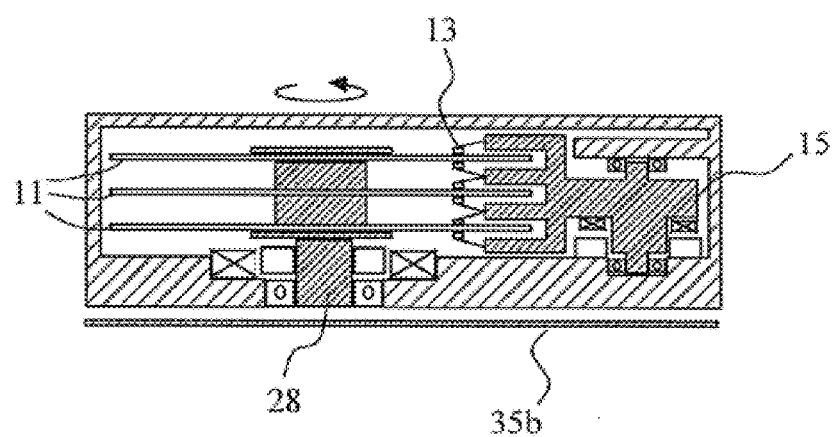

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic recording head includes a main pole having a throat height portion that defines a recording track width by a surface facing a recording medium, and a flare portion that is integrally formed with the throat height portion and gradually increases in width in an element height direction. The head also includes magnetic shields disposed via a nonmagnetic layer on a trailing side of the main pole and on both sides in a track width direction of the main pole and a magnetic film formed on a throat height portion near the rear in the element height direction with respect to an ABS and formed on the flare portion which overhangs in a track width direction on the trailing side of the main pole.

According to another general embodiment, a method of manufacturing a magnetic recording head includes forming a first inorganic insulating film on a substrate, the first inorganic layer having a flattened top so that a top of a yoke portion of a main pole is exposed, the main pole having a throat height portion that defines a recording track width by a facing surface facing a recording medium and a flare portion that is integrally formed with the throat height portion and gradually increased in width in an element height direction; forming a step in the inorganic insulating film; forming a second inorganic insulating film on the stepped first inorganic insulating film; etching the second inorganic insulating film to form a rectangular pedestal for cutting a groove; sequentially depositing an electrode layer for forming magnetic side shields disposed on both sides of the main pole in a track width direction of the main pole; sequentially depositing a protective film for protecting each side face of the rectangular pedestal on each side face of the rectangular pedestal; coating organic resin over each surface; etching the organic resin until the rectangular pedestal is exposed; forming a groove having an inverted trapezoidal profile in the rectangular pedestal; expanding the groove in the rectangular pedestal; filling the groove in the rectangular pedestal with a magnetic plating film; removing any extraneous magnetic plating film above the groove; removing the protective film on each side face of the rectangular pedestal to expose the electrode layer for forming each magnetic side shield layer; forming each magnetic side shield layer by magnetic plating; flattening the magnetic plating; depositing an inorganic insulating film on a substrate, which is flattened so that surfaces of respective regions are exposed; forming a resist pattern on the inorganic insulating film; etching the inorganic insulating film, each magnetic side shield layer, the rectangular pedestal, and the magnetic layer in the groove with the resist pattern as a mask; depositing an electrode layer for forming a trailing magnetic shield on a trailing side of the main pole; and forming a magnetic plating layer for forming the trailing magnetic shield which overhangs in a track width direction on the trailing side of the main pole and on a throat height portion at a back of the main pole in the element height direction with respect to an ABS.

According to one approach, a perpendicular magnetic recording head is provided, in which adequate magnetic field strength is secured even if a main pole of a recording head is reduced in width, and a certain magnetic clearance angle is secured with respect to an adjacent track even if a magnetic head has a skew angle. Thereby, high recording density is achieved.

To reduce influence on an adjacent track during writing into a magnetic recording medium, a method is given according to one approach, in which a bevel angle of a main pole is increased to obtain a magnetic clearance angle. However, if a main pole has a large bevel angle, area of an air-bearing surface (ABS) is decreased, leading to a problem of further reduction in writing field strength. Thus, a contour line of strength of a recording field emitted by a main pole is focused to obtain a large magnetic clearance angle while the bevel angle of the main pole is reduced substantially.

Figure 24:
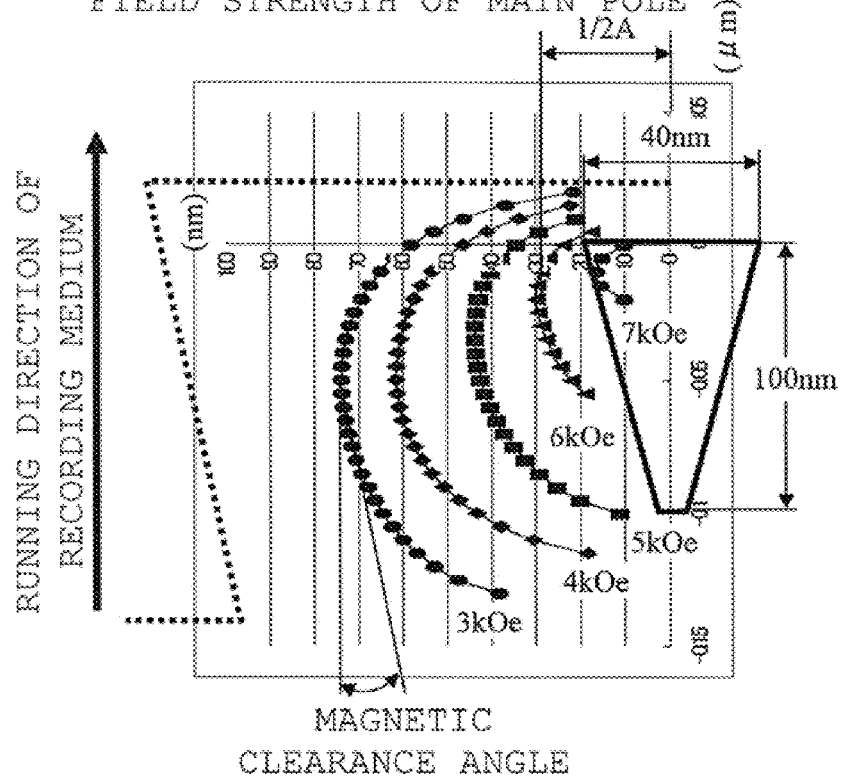
FIG. 24 includes diagrams showing contour lines of magnetic field strength of a recording medium and a magnetization reversal pattern thereof.
Figure 24:
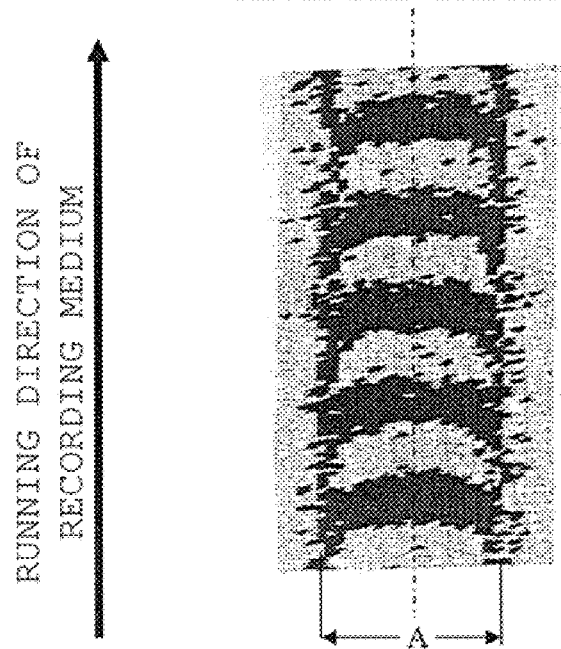

FIG. 24 shows contour lines of a magnetic field strength of a recording medium and a magnetization reversal pattern thereof, according to one embodiment. A single-pole recording head was used, of which the main pole had a track width of 40 nm, a thickness of 100 nm, and a bevel angle of 9°. FIG. 24(a) shows an ABS profile of the main pole on the right of a contour line diagram, and shows one side of each of contour lines of magnetic field strength of 3 kOe to 7 kOe on a recoding medium side. The contour lines of magnetic field strength of the main pole concentrically distribute with maximum strength at a center of the main pole, and a contour line on a more outer side shows more expanded distribution. A contour line of magnetic field strength of 6 kOe allows formation of a magnetic clearance angle similar to a bevel angle given to the main pole. Therefore, it is known that the magnetic clearance angle depends on the bevel angle of the main pole, and a difference in magnetic field strength is provided between a trailing side and a leading side of the main pole due to an effect of the bevel angle.

FIG. 24(b) is a view obtained by simulation of a magnetization state recorded in a recording medium, according to one embodiment. A pattern of recording magnetization reversal is determined as reflecting a shape of a contour line of which the recording field strength corresponds to coercive force of a recording medium, and it is known that the pattern is curved from a track center to a track end in a running direction of a recording medium. Such curvature causes a problem that when data are reproduced by a magneto-resistive effect reproducing head, width of magnetization reversal is large, so that a half value width of a solitary wave is increased. In addition, recording track width is reduced with an increase in line recording density. Therefore, in order to achieve high recording density, a position, at which the magnetic clearance angle is formed on the contour line must be made close to a trailing side to reduce the curvature.

In a magnetic recording head, according to one embodiment, a magnetic film is provided, which overhangs on a trailing side of a throat height portion retracted from an ABS of a main pole in an element height direction, and on a trailing side of a flare portion. Magnetic flux from such an overhanging magnetic film flows into the main pole from a trailing side and side faces of the main pole, so that a difference in magnetic field strength between the trailing side and a leading side is increased while magnetic field strength of the main pole as a whole is increased.

According to some embodiments, a magnetic film overhanging on a trailing side of a main pole is added whereby magnetic flux flows to a main pole side so that magnetic field strength on the trailing side is advantageously increased. Furthermore, since a difference in magnetic field strength between the trailing side and the leading side is increased, a magnetic clearance angle larger than a bevel angle given to the main pole is advantageously formed. Thus, a magnetic recording head can be provided, which has an advantage that while a main pole, which is originally reduced in writing performance due to a reduction in a size of a recording head, has writing performance of a high magnetic field gradient and high magnetic field strength, even if a skew angle is provided, an adequate magnetic clearance angle with respect to an adjacent track may be formed, and a bit having a small curvature of a magnetization reversal pattern may be recorded by a recording magnetic field emitted to a recording medium.

In the following described figures, like functional portions are described with like references.

In one approach, since a portion of a magnetic layer overhanging a trailing side of a main pole has a different function from the main pole, the portion is described below with a name of a roof magnetic layer as a structure separated from the main pole. The roof magnetic layer is a magnetic film that overhangs in a manner of wrapping a trailing side of a flare portion of the main pole from a throat height portion of the main pole, and has a region that is gradually increased in thickness in an element height direction.

FIG. 1 is a conceptual view of a magnetic recording/reproducing device, according to one embodiment. A magnetic recording medium (perpendicular magnetic disk) 11 is rotationally driven by a motor 28. When information is inputted or outputted, a slider 13 fixed to a fore end of a suspension arm 12 is moved to a predetermined position on a rotating magnetic recording medium 11, and a magnetization signal is recorded or reproduced by a magnetic head mounted on the slider 13. A rotary actuator 15 is driven, thereby the magnetic head may select a track position in a radial direction of the magnetic recording medium 11. A recording signal into a recording head and a read signal from a reproducing head are processed by signal processing circuits 35a and 35b respectively.

Figure 2:
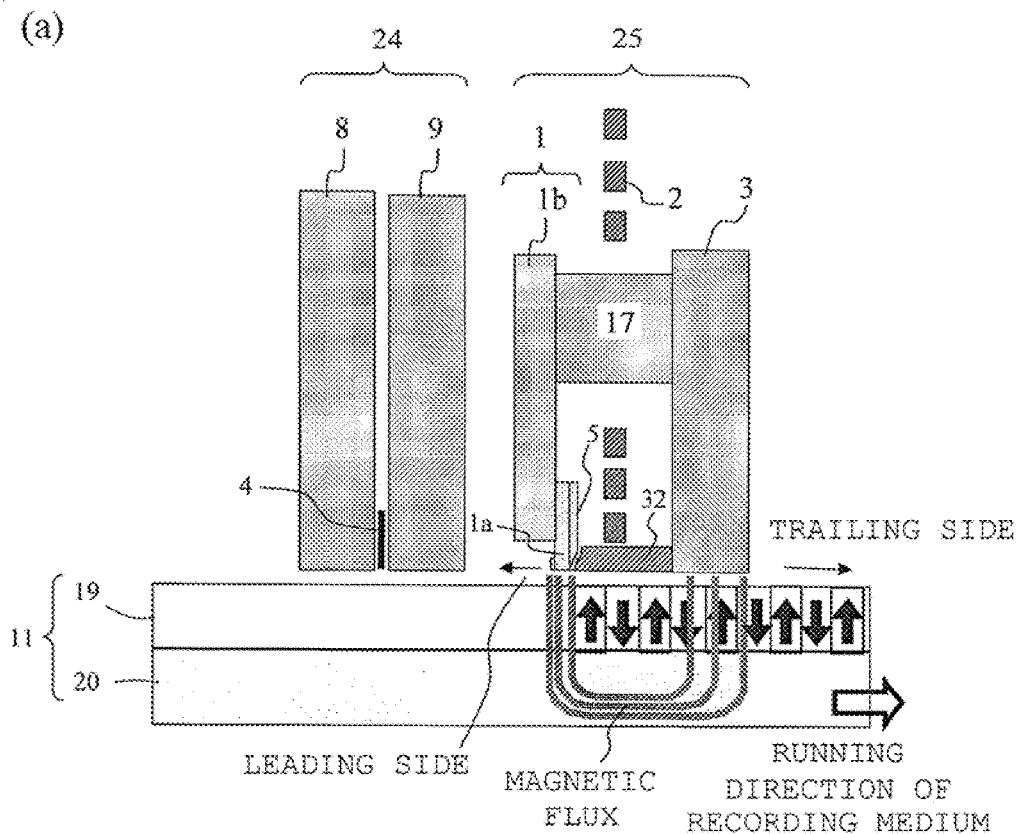
FIG. 2 includes schematic section views of a magnetic head according to one approach.
Figure 2:
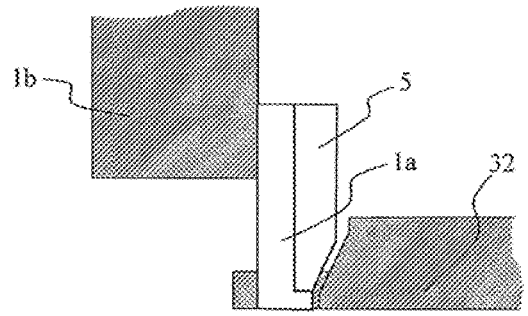

FIG. 2 includes schematic section views of a magnetic head according to one embodiment. FIG. 2(a) is a schematic section view at a track center showing an example of the magnetic head, and FIG. 2(b) is an enlarged view of a portion near an end of a main pole on an ABS side, according to one embodiment.

The magnetic head is a recording/reproducing composite head having a single-pole recording head 25 including a main pole 1 and a return pole 3, and a magneto-resistive effect reproducing head 24, according to one embodiment. A read element 4 including a giant magneto-resistive-effect (GMR) element or a tunnel magneto-resistive-effect (TMR) element is disposed between a pair of magnetic shields (reproducing shields) including a lower shield 8 on a leading side and an upper shield 9 on a trailing side. The main pole 1 and the return pole 3 of the recording head 25 are magnetically connected to each other by a pillar 17 at a position away from the ABS in an element height direction, and a thin film coil 2 is wound on a magnetic circuit configured of the main pole 1, the return pole 3, the pillar 17, and a magnetic recording medium 11. The main pole 1 is configured of a main-pole yoke portion 1b connected to the pillar 17, and a main-pole writing portion 1a including a throat height portion that defines writing width, and a flare portion that is integrally formed with the throat height portion and gradually increased in width in an element height direction, wherein a roof magnetic layer 5 of this embodiment is formed away from an ABS in an element height direction in a manner of wrapping the main-pole writing portion 1a from a trailing side, and has a region being gradually increased in thickness.

For the main pole 1a, for example, a single-layer film, a stacked film, or an alloy film of a magnetic material having high saturation magnetic-flux density Bs, which includes at least two elements of Co, Ni and Fe, may be used. As a material of the main-pole yoke portion 1b, for example, a magnetic material having high permeability, which includes at least two elements of Co, Ni and Fe, is used. The roof magnetic layer 5, according to one embodiment, may be integrally structured with the main pole 1a. In the case that the roof magnetic layer is separately structured from the main pole, a single-layer film, a stacked film, an alloy film, or a plated film, the film being different from the film of the main pole 1a, of a magnetic material having high saturation magnetic-flux density Bs, which includes at least two elements of Co, Ni and Fe, may be used for the roof magnetic layer.

A magnetic field emitted from the main pole 1a of the recording head 25 enters the return pole 3 through a magnetic recording layer 19 and a soft underlayer (SUL) 20 of the magnetic recording medium 11, and thereby a magnetization pattern is recorded in the magnetic recording layer 19. The magnetization pattern is defined by writing performance of the main pole 1 and magnetic shields 32 provided on the ABS side.

Figure 3:
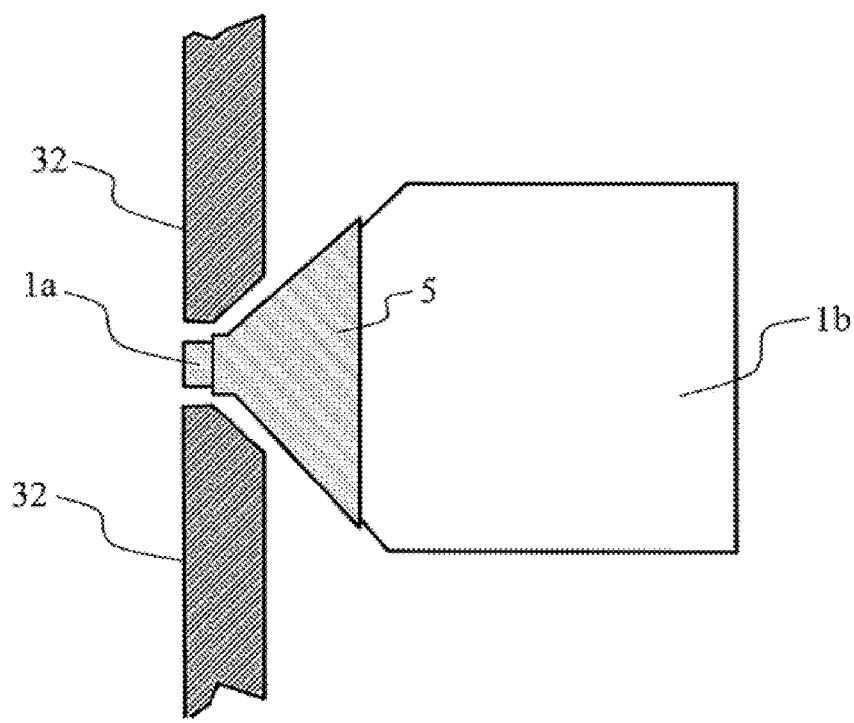
FIG. 3 includes a schematic plan view and a schematic side section view of a main pole portion of a perpendicular magnetic recording head, according to one embodiment.
Figure 3:
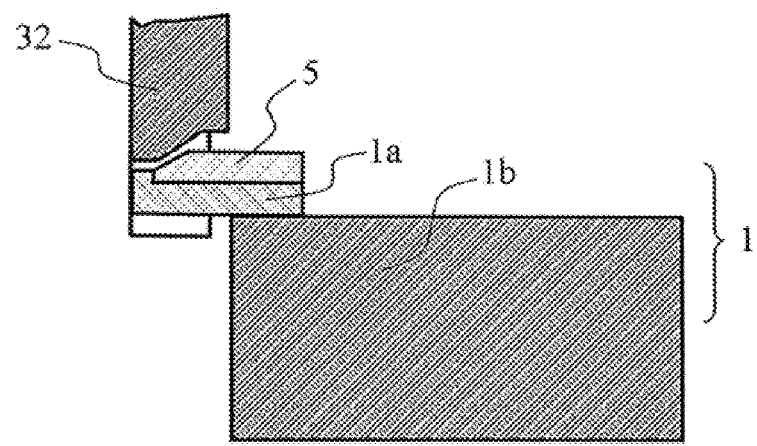
Figure 4:
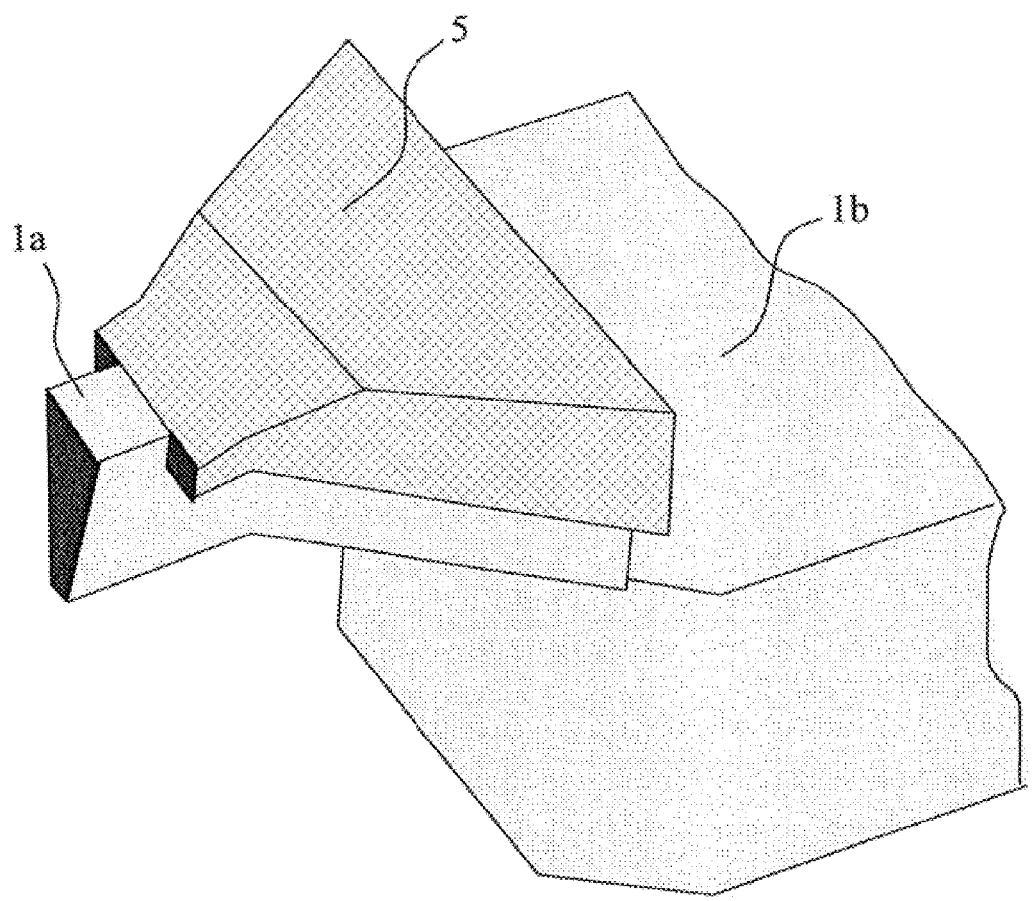
FIG. 4 is a schematic view of the main pole and a roof magnetic layer of the perpendicular magnetic recording head according to one embodiment.

FIG. 3 is a schematic plan view and a schematic side section view of a main pole, according to one embodiment, which is shown in an extracted manner. FIG. 4 is a schematic view of the main pole and a roof magnetic layer, which are shown in an extracted manner, according to one embodiment.

The examples shown in FIGS. 3 and 4 are described below. In the case of the example, as shown in FIGS. 3(a) and 3(b), the main pole 1a is surrounded by the shields 32 from three sides via a nonmagnetic layer so as to restrict emission of magnetic flux from the main pole 1a to a magnetic recording medium, and has a roof magnetic layer 5 on a throat height portion defining track width of the main pole 1a and on a flare portion. The roof magnetic layer 5 shown in FIG. 3(a) is set wide compared with track width of the main pole 1a on an ABS, and the main pole 1a is magnetically connected to a main pole yoke portion 1b. As shown in FIG. 3(b), when the main pole 1a is seen from a side face, the roof magnetic layer 5 has a tapered portion being increased in thickness in an element height direction, and is flattened when the roof magnetic layer reaches a setting thickness. As shown in FIG. 4, part of the roof magnetic layer 5 is formed in a manner of extending to both side faces on a trailing side of the main pole 1a, and wrapping a trailing side of the throat height portion of the main pole 1a and a trailing side of the flare portion thereof. In the case of an integral configuration, the roof magnetic layer is structured such that a magnetic body overhangs in a track direction.

Such a configuration provides an advantage that magnetic flux is supplied from the roof magnetic layer 5 being large in width compared with the track width of the main pole 1a to the trailing side of the main pole, so that a difference in magnetic field strength between a trailing side and a leading side of a writing pole can be increased while increasing magnetic field strength of the main pole 1a itself, according to one embodiment. Furthermore, the main pole 1a has an advantage that magnetic flux is locally supplied form both side faces on the trailing side, thereby distribution of writing field strength, which is defined by an ABS profile of the writing pole, is changed so that a magnetic clearance angle, which previously depends on a bevel angle of the main pole 1a, is increased.

The magnetic recording head, according to one embodiment, shown in FIG. 3 and a magnetic recording head having a previous shape were subjected to three-dimensional magnetic field calculation of magnetic field strength, a magnetic field gradient, and a magnetic clearance angle, which show recording performance of a recording head.

Figure 5:
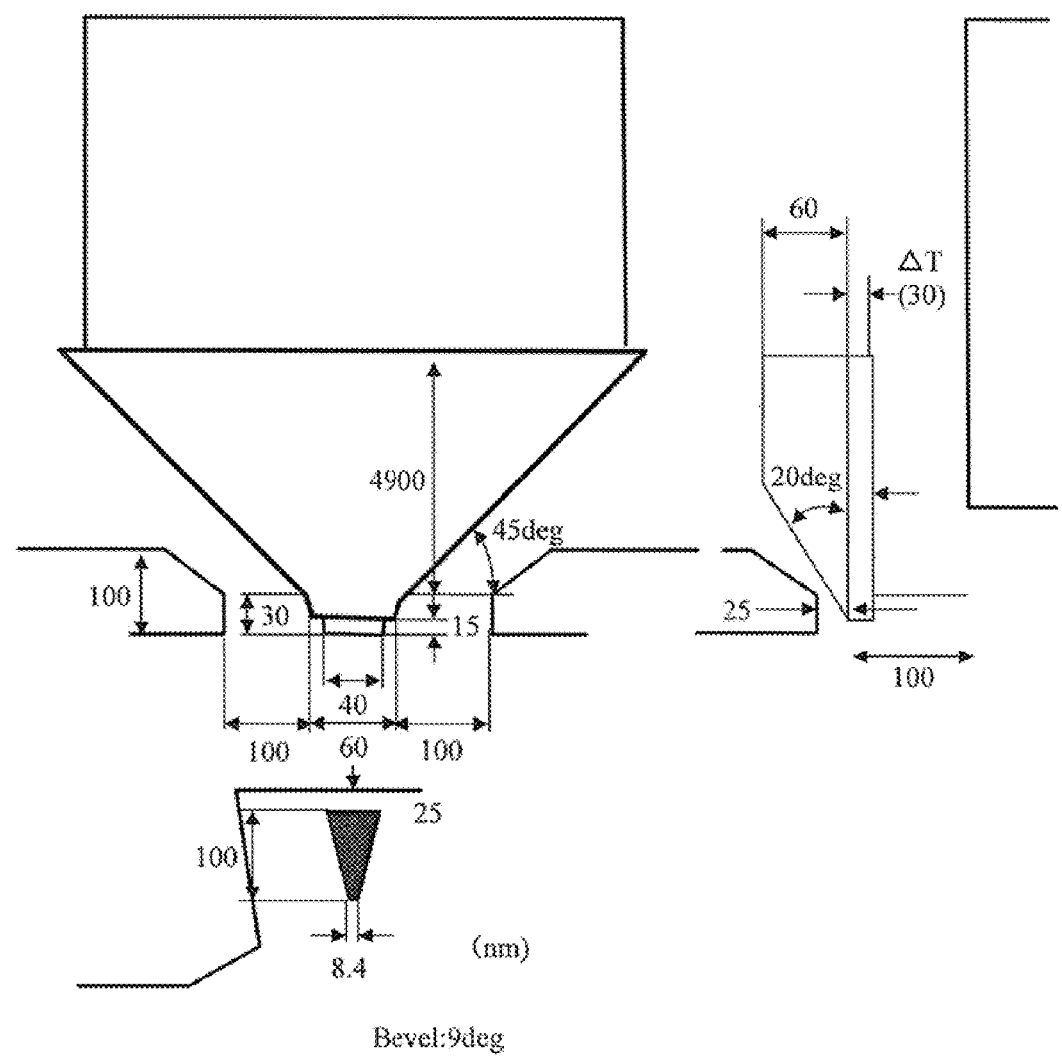
FIG. 5 is a diagram showing a model condition used for three-dimensional magnetic field calculation, according to one embodiment.

FIG. 5 shows a model condition of the magnetic recording head, according to one embodiment, used for the three-dimensional magnetic field calculation. In the recording head, in one approach, it was assumed that the main pole 1a had a track width of 40 nm, a thickness of 100 nm, a bevel angle of 9°, throat height to an ABS was 30 nm, a flare portion being gradually increased in width from a throat-height-defined region extended by 4.9 μm in an element height direction, an interval between the main pole and a side shield was 100 nm, a trailing interval was 25 nm, and a length of each shield was 100 nm in the element height direction. The roof magnetic layer 5 of this embodiment was formed to be large in width by 20 nm compared with width of the main pole 1a in a region from a position spaced by 15 nm from the ABS in the element height direction to a position of a flare portion spaced by 4.9 μm from the position, and have a thickness on the trailing side of 60 nm, and a taper angle of 20° so that it wraps the trailing side and side faces of the main pole 1a. A positional relationship between the magnetic head and a recording medium was assumed such that a distance between the magnetic head and the recording medium was 10 nm, and a distance between the magnetic head and an underlayer of the recording medium was 59.5 nm. The reason why the roof magnetic layer 5 is retracted from the ABS in the element height direction is because such operation may prevent direct writing by magnetic flux supplied from the roof magnetic layer 5 into the recording medium 11, and the roof magnetic layer is spaced from the recording medium by at least 15 nm compared with flying height of the magnetic head with respect to the recording medium, resulting in a reduction in write blurring on a writing track due to leakage of magnetic flux from the roof magnetic layer 5. Moreover, the magnetic layer is preferably provided on each side face on the trailing side of the main pole 1a with its section area being small from a point of view of reducing write blurring on a writing track, and preferably provided with a width of 20 nm or less for achieving an advantage of embodiments of the invention.

A previous recording head of a comparative example 1 for comparison with the recording head, according to one embodiment, uses a single pole for the main pole 1a, and does not have the roof magnetic layer. For others such as a main pole profile, a shield interval, and shield length in an element height direction, the same condition as previously described was used.

In a recording head of a comparative example 2, a structure was used to show the advantages, in some approaches, while writing performance was reduced, in which the roof magnetic layer 5 did not exist on a trailing side of the main pole 1a, and a magnetic layer having a width of 10 nm and a thickness of 30 nm was disposed only on each side face on the trailing side of the main pole 1a. For others such as a main pole profile, a shield interval, and shield length in an element height direction, the same condition as the condition of an embodiment of the present invention was used.

Cobalt-nickel-iron (CoNiFe) was used as a material of the writing portion 1a of the main pole 1 and a material of the roof magnetic layer 5, which was assumed to have a saturation magnetic flux density of 2.4 T and a relative permeability of 500. For the main-pole yoke portion 1b, 80 at % Ni-20 at % Fe having a saturation magnetic flux density of 1.0 T and a relative permeability of 1500 was assumed. For the shield 32, 80 at % Ni-20 at % Fe having a saturation magnetic flux density of 1.0 T and a relative permeability of 1500 was assumed. CoTaZr was used as a material of the soft underlayer 20 of the magnetic recording medium 11, and thickness of the layer 20 was assumed to be 60 nm. Writing characteristics and the like were calculated at a position assumed as a center position of the magnetic recording layer spaced by 22 nm from the ABS of the head. A medium recording layer of the recording medium 11 was assumed to be 20 nm in thickness, and a magnetization characteristic of the layer was not taken into consideration.

Figure 6:
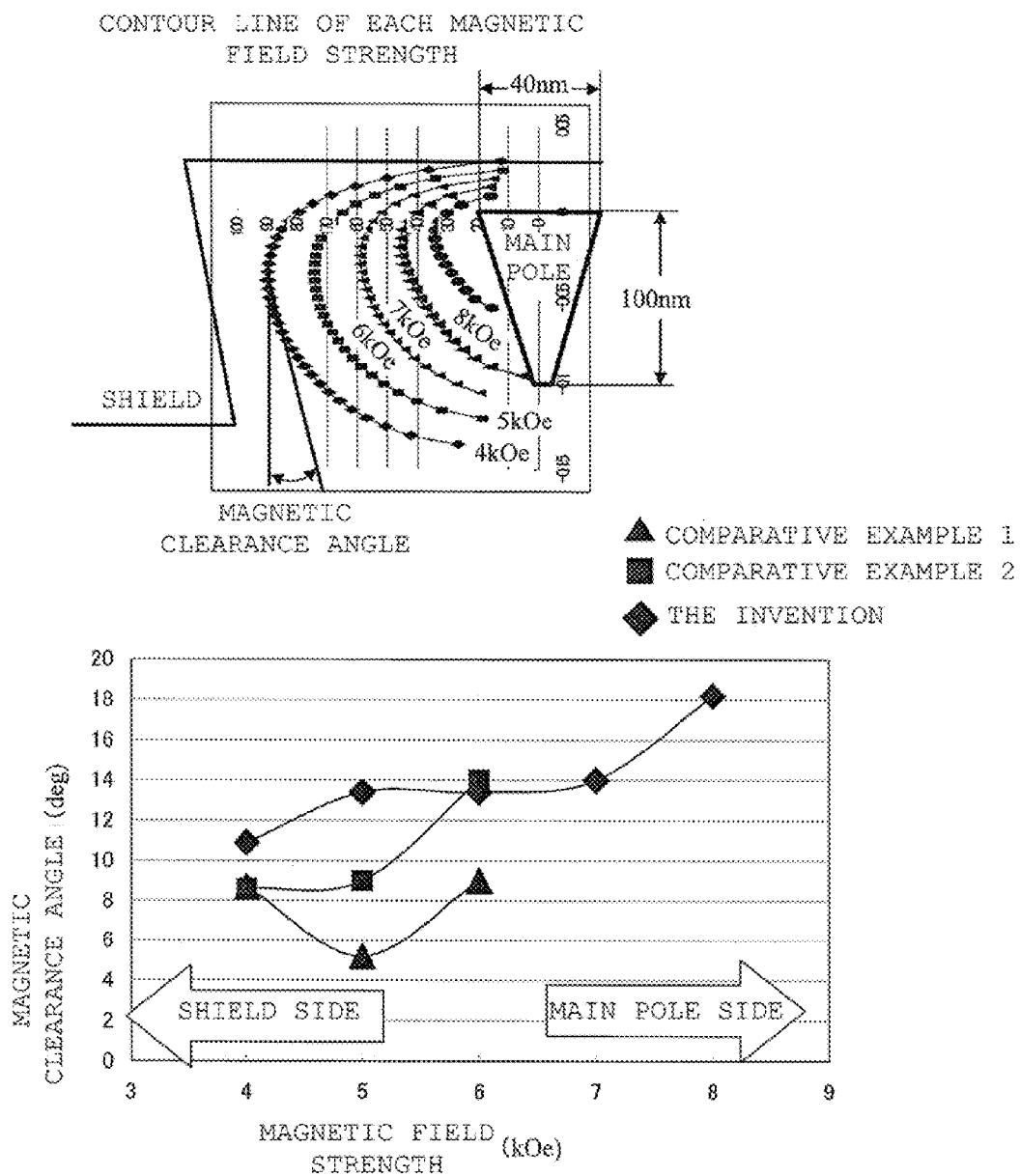
FIG. 6 includes diagrams showing a relationship between a contour line of magnetic field strength and a magnetic clearance angle of a recording head, according to one embodiment.

FIG. 6 includes diagrams showing a relationship between a contour line of a magnetic field strength and a magnetic clearance angle of the recording head, according to one embodiment, which are calculated using the calculation model of FIG. 5. As the magnetic clearance angle, in a condition that a magnetic recording head did not have a skew angle, an angle of a contour line of magnetic field strength on a leading side with respect to a running direction of a recording medium from a track width having the largest writing width was calculated for each magnetic field strength.

As shown in FIG. 5, the recording head, according to one embodiment, was formed in such a manner that the main pole 1a was wrapped by the roof magnetic layer 5 that was formed on the trailing side of the main pole 1a with a thickness of 60 nm, a taper angle of 20°, and a width being large by 20 nm compared with track width of a throat height portion, and formed on each side face on the trailing side with a width of 10 nm, and a length ΔT of 30 nm in a depth direction.

A magnetic clearance angle given by the single-pole recording head of the comparative example 1 is shown as 9° being the same as the bevel angle, which becomes smaller than the bevel angle due to reduction in magnetic field strength of a contour line, leading to a problem of attenuating and erasing information on a track adjacent to a writing track. In the recording head of the comparative example 2, a magnetic clearance angle of 14° being larger than the bevel angle of 9° of the main pole 1a is formed, and magnetic flux is absorbed by the side shields 32 while keeping an angle equal to or larger than the bevel angle of 9°. That is, the magnetic layer added on each side face on the trailing side of the main pole 1a has an effect that magnetic flux is flowed into the main pole 1a so as to increase a difference in distribution of magnetic field strength between the trailing side and the leading side, so that the magnetic clearance angle is made larger than the geometric bevel angle of the main pole 1a.

The recording head, according to one embodiment, is featured by the roof magnetic layer 5 formed by depositing a magnetic layer on the trailing side of the main pole 1a, in addition, on each side face thereof while using the effect of the comparative example 2. The roof magnetic layer 5 is provided, thereby while high magnetic field of 8 kOe is emitted, a magnetic clearance angle of 18° corresponding to an angle two times as large as the bevel angle, 9°, of the main pole 1a is formed by a contour line of the magnetic-field strength of 8 kOe, and magnetic flux is absorbed by the shield 32 disposed on each side while keeping a magnetic clearance angle larger than the bevel angle.

The recording head, according to one embodiment, has an advantage that the roof magnetic layer 5 is provided, thereby while high writing magnetic-field strength is achieved, a difference in distribution of magnetic field strength between the trailing side and the leading side can be increased, leading to increase in magnetic clearance angle.

Figure 7:
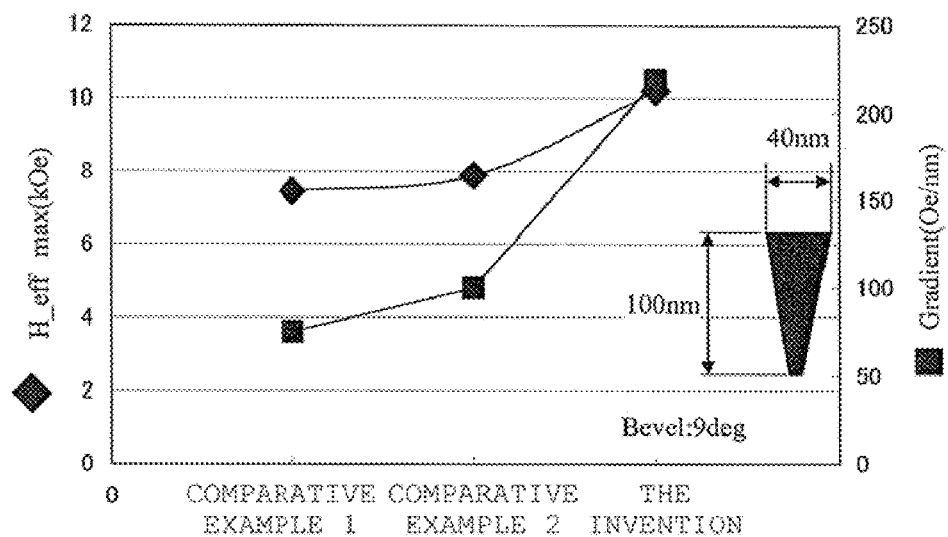
FIG. 7 includes diagrams showing a relationship between magnetic field strength and a magnetic field gradient, according to one embodiment.
Figure 7:
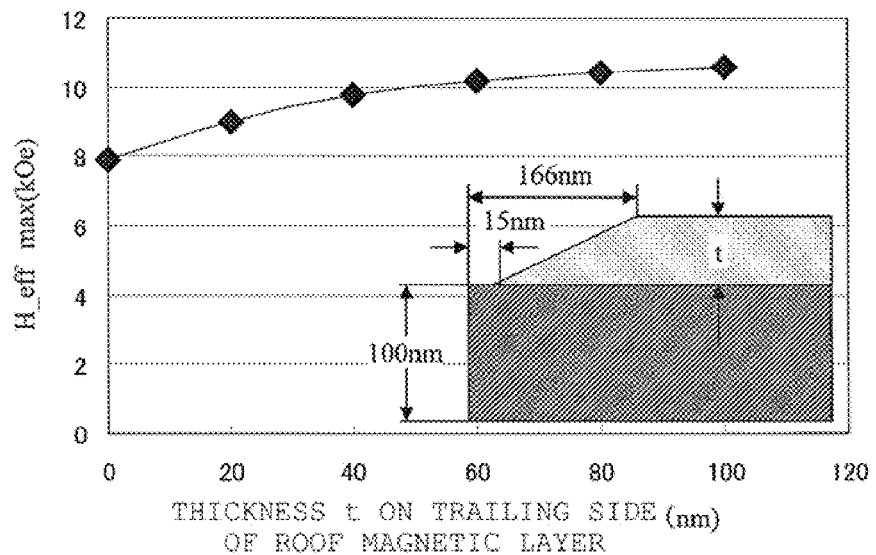

FIG. 7 shows a relationship between magnetic field strength and a magnetic field gradient according to the calculation model used in FIG. 5. FIG. 7(a) shows a relationship between magnetic field strength and a magnetic field gradient of the recording head, according to one embodiment. The recording head, according to one embodiment, has an advantage that the roof magnetic layer 5 is provided in a manner of wrapping the trailing side of the main pole 1a, thereby magnetic field strength and a Magnetic field gradient are improved compared with the comparative example 1 and the comparative example 2 having the magnetic layer only on each side face on the trailing side of the main pole 1a, leading to improvement in writing performance.

FIG. 7(b) shows a relationship between thickness t on the trailing side of the roof magnetic layer and magnetic field strength. Roof thickness on the trailing side of the main pole 1a is changed while a border position between an ABS side of the roof magnetic layer 5 and a flat portion thereof is not changed. The magnetic field strength of the roof magnetic layer 5 on the trailing side of the main pole 1a tends to increase depending on thickness. However, the amount of change in magnetic field strength becomes small in a range from 80 nm to 100 nm. It is presumed that even if the roof magnetic layer is deposited on the trailing side of the main pole 1a with a thickness of 100 nm or more, an effect of increasing a magnetic field is small.

Figure 8:
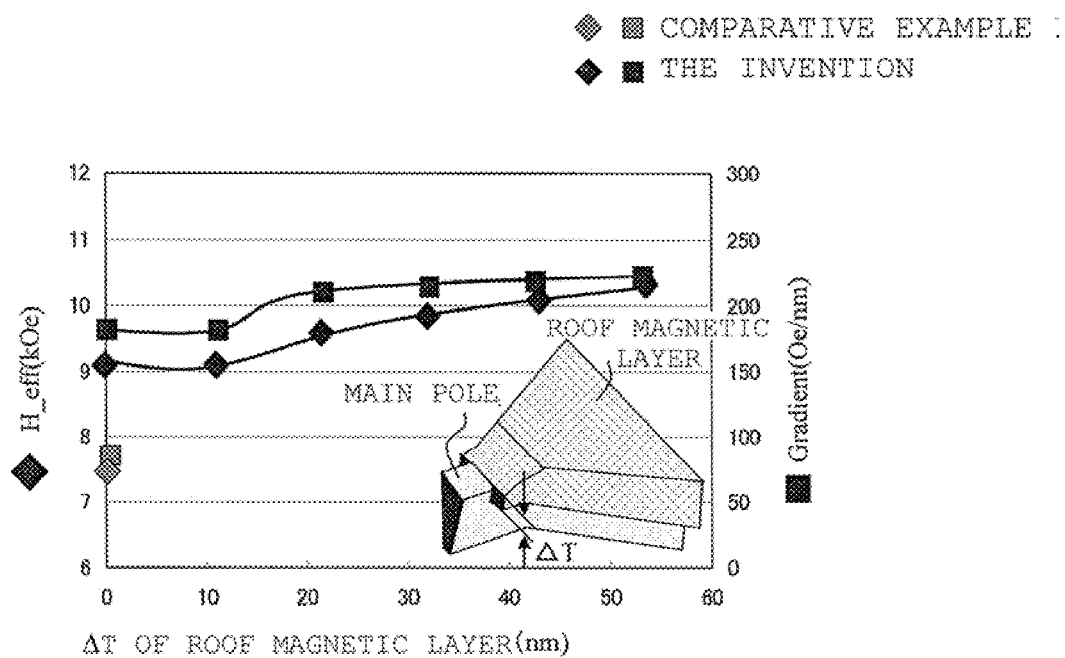
FIG. 8 includes a diagram showing a relationship between magnetic field strength, a magnetic field gradient, and a magnetic clearance angle in the case that a ΔT portion is changed in thickness, according to one embodiment.

FIG. 8 shows a relationship between magnetic field strength and a magnetic field gradient calculated using the calculation model of FIG. 5 in the case that the roof magnetic layer is provided on the trailing side of the main pole 1a and on each side face on the trailing side thereof, and a thickness ΔT portion added on each side face of the roof magnetic layer is changed in thickness. A horizontal axis of FIG. 8 shows depth of the ΔT portion of the roof magnetic layer 5 provided on each side face on the trailing side of the main pole 1a. Magnetic field strength and a magnetic field gradient of the comparative example 1 having no roof magnetic layer are plotted at a position of 0 on the horizontal axis of FIG. 8. The recording head according to one embodiment of the present invention is greatly improved in writing performance compared with the comparative example 1, and when the ΔT portion of the roof magnetic layer 5 provided on each side face on the trailing side of the main pole 1a has a thickness of 10 nm or more, the magnetic field strength is advantageously increased. The magnetic field gradient is shown with a constant value in a thickness rage of 20 nm or more even if magnetic field strength is increased.

Figure 9:
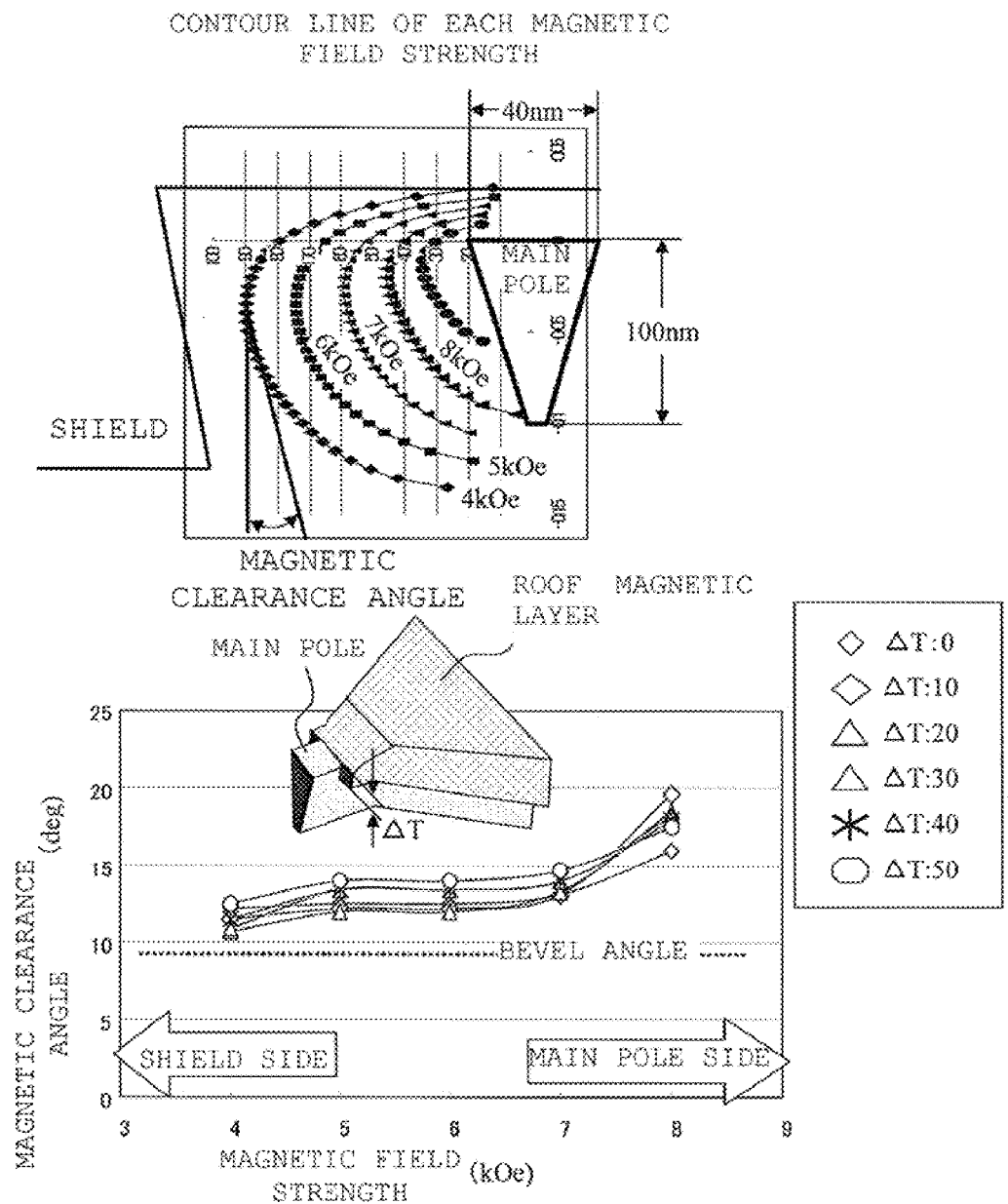
FIG. 9 includes diagrams showing a relationship between a magnetic clearance angle and ΔT, according to one embodiment.

FIG. 9 shows a relationship between a magnetic clearance angle calculated using the calculation model of FIG. 5 and ΔT. A horizontal axis of FIG. 9 shows magnetic field strength of recording heads having different ΔT. As the magnetic clearance angle, in a condition that a magnetic recording head did not have a skew angle, an angle of a contour line of magnetic field strength on a leading side with respect to a running direction of a recording medium from a track width having the largest writing width was calculated for each magnetic field strength. Here, ΔT=0 corresponds to a recording head in which the roof magnetic layer 5 is deposited only on the trailing side of the main pole 1a.

In the recording head, according to one embodiment, while a magnetic clearance angle larger than the bevel angle of the main pole 1a is kept, the magnetic clearance angle may be further increased due to change of ΔT. In a contour line of magnetic field strength of 8 kOe near the main pole 1a, the largest magnetic clearance angle is formed at ΔT=10 nm, and the angle tends to decrease with increase in ΔT. In a range of magnetic field strength of 7 kOe to 5 kOe, the magnetic clearance angle is reversed with increase in ΔT. The reason for this is presumed as follows: in the case of ΔT=10 nm, since amount of magnetic flux entering the main pole from the magnetic layer provided on each side face on the trailing side of the main pole is small, while a difference in magnetic field strength between the trailing side and the leading side is large in a high magnetic field strength region, amount of magnetic flux is insufficient to keep the difference in magnetic field strength in a low magnetic field strength region, and therefore the magnetic clearance angle is decreased in the region. However, it is known that since the recording head has an effect of increasing the magnetic clearance angle compared with the bevel angle, 9°, of the main pole 1a, the roof magnetic layer 5 may be unproblematically provided with thickness ΔT being up to about ½ of thickness of the main pole 1a.

Figure 10:
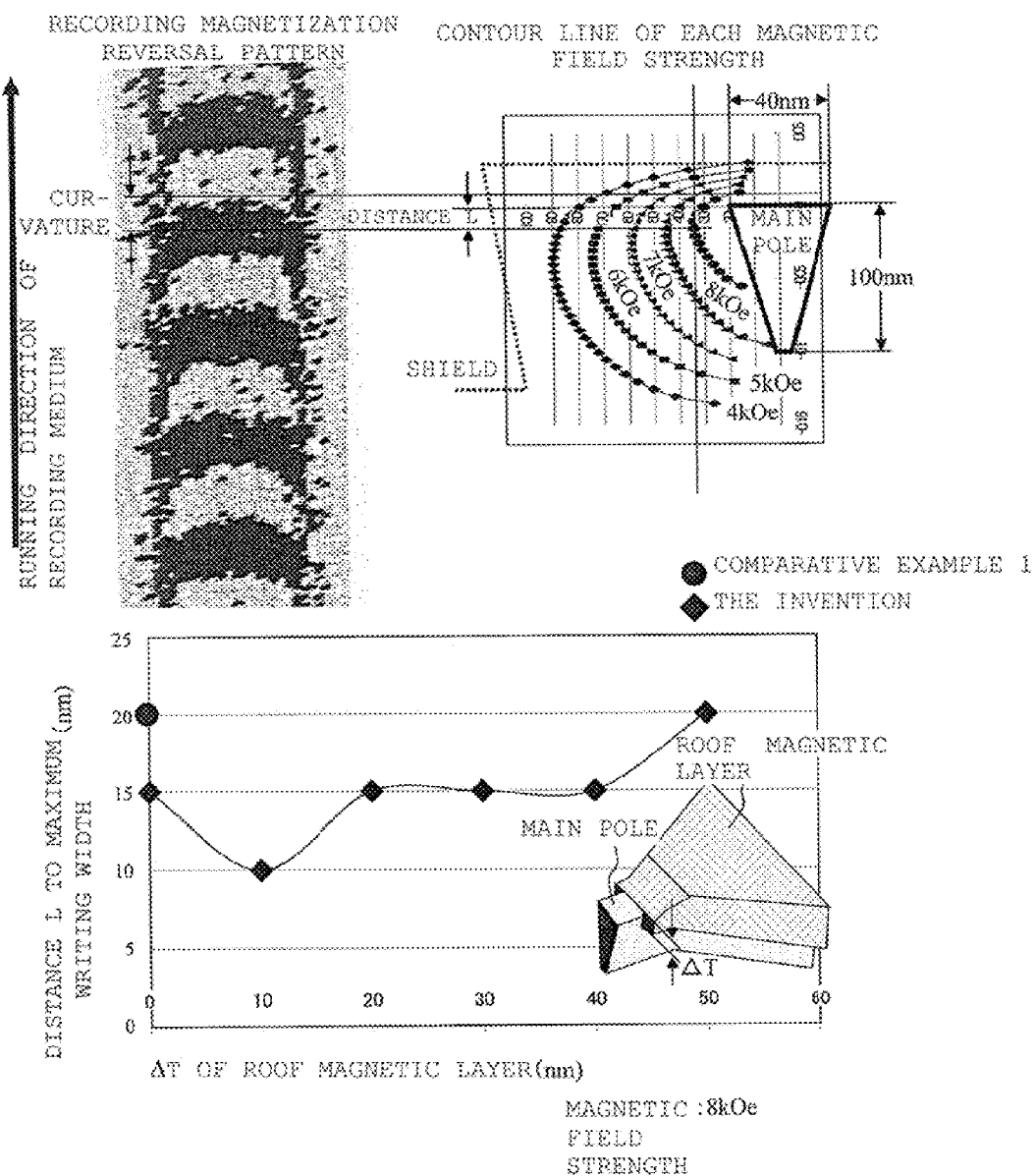
FIG. 10 includes diagrams showing a relationship between a distance L from a trailing end face to writing width of the main pole and ΔT, according to one embodiment.

However, a problem still remains, including a problem of curvature from a track center to a track end of a recording magnetization reversal pattern recorded in a recording medium. FIG. 10 shows a relationship between a distance L from a trailing end face to writing width of the main pole, which is calculated using the calculation model of FIG. 5, and ΔT.

The recording magnetization reversal pattern is considered to be determined reflecting a shape of a contour line of which the recording magnetic field strength corresponds to coercive force of a recording medium, and curvature is presumed to be determined by a distance on a trailing side of the main pole determined by a magnetic field gradient caused by the shield 32 on the trailing side and a distance L determined by magnetic field distribution of the main pole. When data are reproduced by a magneto-resistive effect reproducing head, magnetization reversal width appears large, so that half value width of a solitary wave is increased, in addition, recording track width is reduced with increase in line recording density. Therefore, when a value of distance L at a position, at which a magnetic clearance angle is formed, is small, curvature on the trailing side of a magnetization signal written into the recording medium 11 can be reduced. When the curvature is reduced, bit length is shortened, so that recording density can be improved.

In the recording head, according to one embodiment, the distance L is smallest at ΔT=10 nm in magnetic field strength of 8 kOe, and the distance L increases with increase in ΔT, and reaches the same distance L as in the comparative example 1 at ΔT=50 nm being ½ of thickness of the main pole 1a. This shows a fact that when ΔT is increased and thus the roof magnetic layer provided on each side face on the trailing side of the main pole 1a approaches the leading side, the curvature becomes large. If ΔT is increased to the center of thickness of the main pole 1a, while the magnetic clearance angle can be made large, the curvature of the recording magnetization reversal pattern is also increased. Therefore, ΔT is preferably less than ½ of thickness of the main pole on an ABS side provided with the roof magnetic layer on the trailing side of the main pole.

Figure 11:
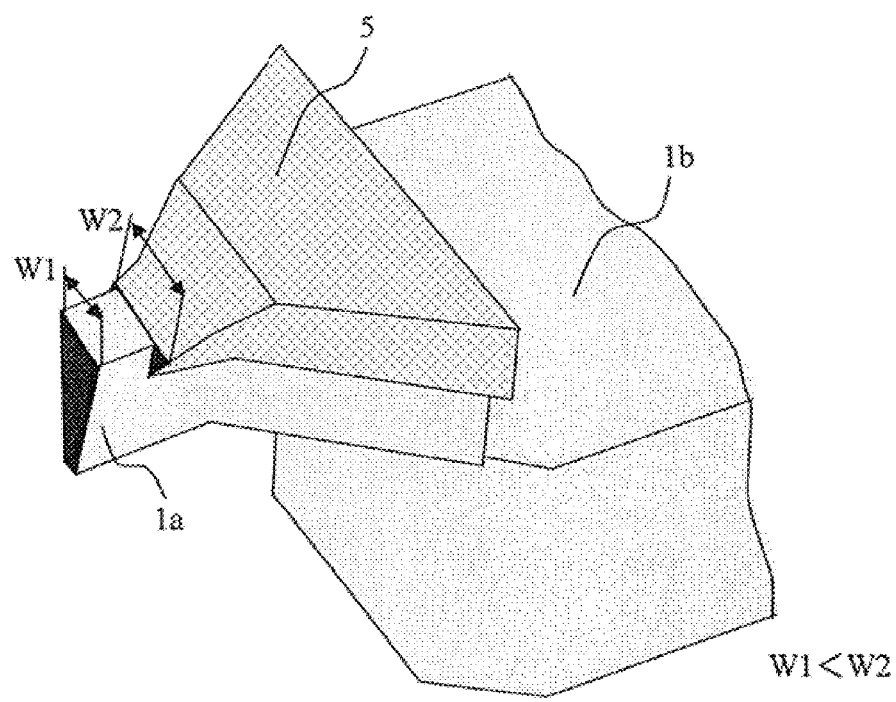
FIG. 11 includes diagrams showing another example of the invention.
Figure 11:
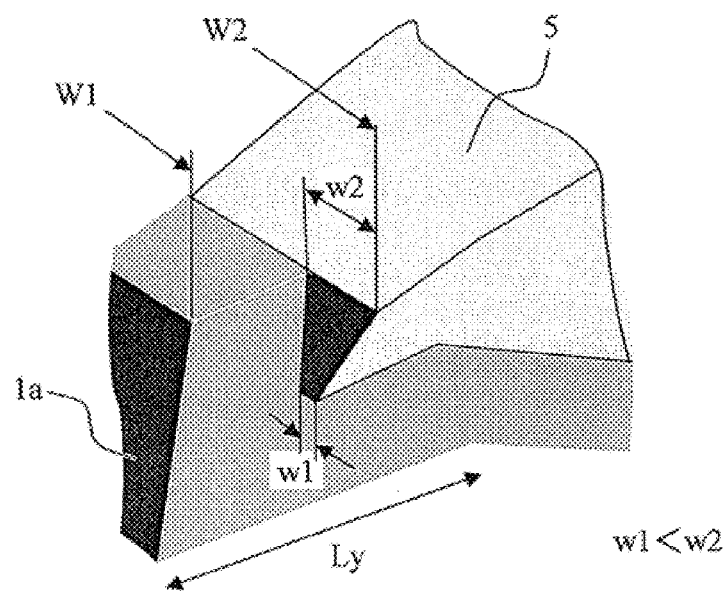
Figure 12:
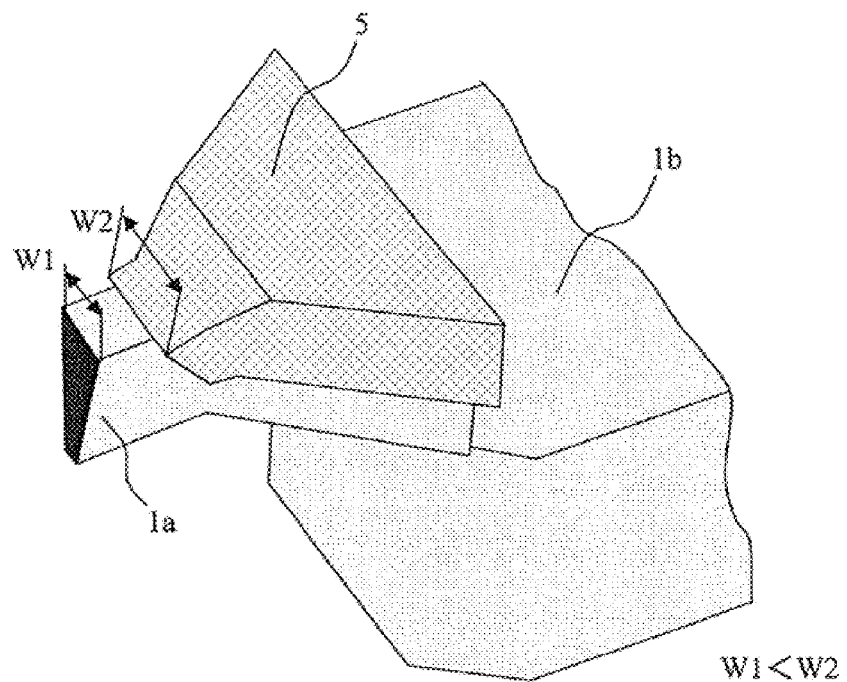
FIG. 12 includes diagrams showing still another example of the invention.
Figure 12:
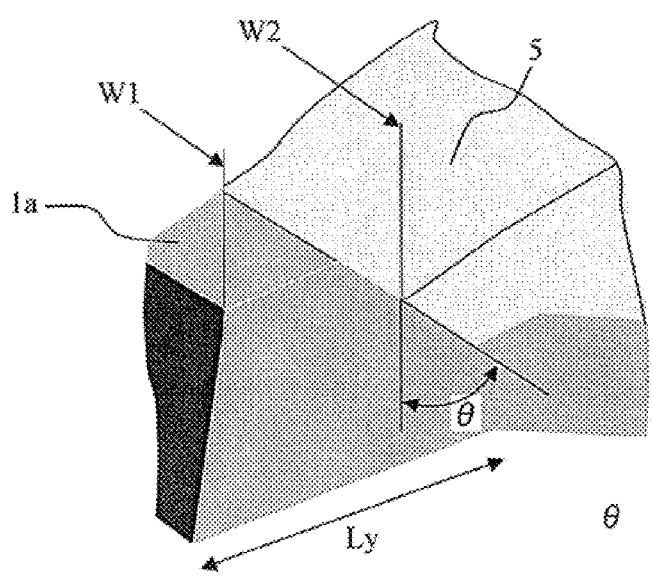

FIGS. 11 and 12 show other examples, according to some approaches. FIG. 11 shows an enlarged schematic view of a portion around a main pole of example 2. In the example 2 shown in FIG. 11, track width W1 of the main pole 1a and width W2 on a trailing side of the roof magnetic layer 5 are in a relationship of W1<W2, and in the case that width w2 on a trailing side of a magnetic layer added on each side face on the trailing side of the roof magnetic layer 5 and width w1 on a leading side of the magnetic layer are in a relationship of w1<w2, a method of supplying magnetic flux from the side face on the trailing side of the main pole 1a is the same as the above, therefore the same effect that the magnetic clearance angle is increased compared with the bevel angle is obtained.

FIG. 12 shows an enlarged schematic view of a portion around a main pole of example 3. In the example 3 shown in FIG. 12, track width W1 of the main pole 1a and width W2 on a trailing side of the roof magnetic layer 5 are in a relationship of W1<W2, and in the case that a surface facing a recording medium of a magnetic layer provided on each side face on the trailing side of the roof magnetic layer 5 has a region retracting with an angle θ from an ABS side in an element height direction, since the method is the same as the above, the same effect that the magnetic clearance angle is increased compared with the bevel angle is obtained, and emission of magnetic flux from the roof magnetic layer on the ABS side to the recording medium 11 can be advantageously reduced.

In order to describe some advantages, in some approaches, a three-dimensional magnetic-field calculation is used, and a magnetic film was called roof magnetic layer, which over-hung in a manner of wrapping a trailing side of a flare portion of the main pole from a throat height portion thereof, and had a region being gradually increased in thickness in an element height direction, and described as a structure separated from the main pole. However, this is because a function of the main pole is different from that of a roof magnetic layer portion. In a manufacturing method, even if the main pole 1a and the roof magnetic layer 5 are integrally formed, the same advantage is obtained.

A method of manufacturing the magnetic recording head, according to one embodiment, having the roof magnetic layer is described. The magnetic recording head, according to one embodiment, can be manufactured by sequentially performing the following steps to form a main pole and shields.

(1) Depositing an inorganic insulating film on a substrate, of which the top is flattened so that a top of a yoke portion 1b of a main pole 1 is exposed, and then forming a resist pattern.

(2) Etching the inorganic insulating film with the resist pattern as a mask to form a step, then removing the resist, and then depositing a second inorganic insulating film, and then forming a resist pattern.

(3) Etching the inorganic insulating film with the resist pattern as a mask to form a rectangular pedestal for cutting a groove.

(4) Sequentially depositing an electrode layer for forming each side shield, and a protective film for protecting each side face of the rectangular pedestal on each side face of the rectangular pedestal.

(5) Coating organic resin over the whole surface.

(6) Etching the organic resin until the rectangular pedestal is exposed.

(7) Forming a groove having an inverted trapezoidal profile for forming a main pole in the rectangular pedestal.

(8) Expanding the groove for forming a roof magnetic film overhanging from track width in the rectangular pedestal.

(9) Filling the groove in the rectangular pedestal with a magnetic plating film to form the main pole and the roof magnetic film.

(10) Removing an unnecessary magnetic plating film.

(11) Removing the protective film on each side face of the rectangular pedestal to expose the electrode layer for forming each side shield layer.

(12) Forming a resist pattern.

(13) Forming each side shield layer by magnetic plating using the resist pattern.

(14) Flattening the magnetic film.

(15) Depositing an inorganic insulating film on a substrate, which is flattened so that surfaces of respective regions are exposed.

(16) Forming a resist pattern.

(17) Etching the inorganic insulating film, each side shield, the rectangular pedestal, and the magnetic layer in the groove with the resist pattern as a mask.

(18) Depositing an electrode layer for a shield on a trailing side.

(19) Forming a resist pattern.

(20) Forming a magnetic plating layer for the shield on the trailing side with the resist pattern as a mask.

FIGS. 13 to 22 are schematic views of a manufacturing process showing an example of a method of manufacturing the magnetic recording head, according to one embodiment.

Figure 13:
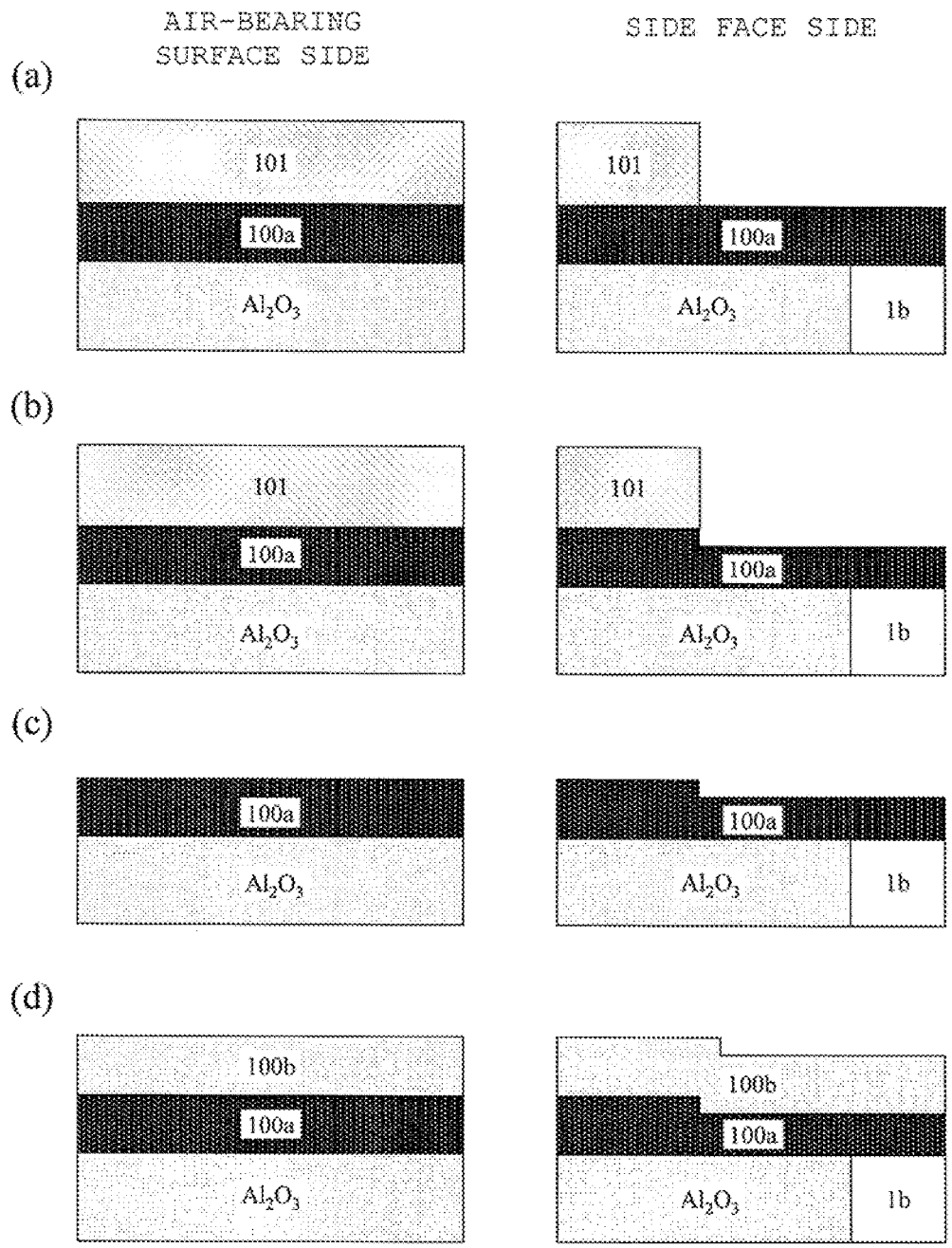
FIG. 13 includes manufacturing process views showing an example of a method of manufacturing a magnetic recording head, according to one embodiment.

FIG. 13 shows a manufacturing process from a state where the yoke portion 1b of the main pole 1 is manufactured, then a surface of the main pole is flattened by CMP (Chemical Mechanical Polishing) process. A left view of the figure shows a schematic view of such a main pole portion seen from an ABS side. A right view of the figure shows a schematic view from a side face side. The yoke portion 1b is shown in the lower right view of the side views on the right of the figure.

FIG. 13(a) shows a step that an inorganic insulating film 100a is deposited on a substrate, of which the top is flattened so that a top of a yoke portion 1b of a main pole 1 is exposed, and then a resist pattern 101 is formed. For the inorganic insulating film 100a, for example, an oxide or a nitride of Al, Si, Ta, Ti and the like may be used. FIG. 13(b) shows a state where etching of the inorganic insulating film 100a is performed using the resist pattern 101 as a mask. The inorganic insulating film is etched by an ion milling method using Ar as a main gas so that a step is formed. FIG. 13(c) shows a state where the resist is removed after etching. A position of the step corresponds to a position of an ABS of a magnetic film overhanging in a track width direction on a trailing side of the main pole 1a. In the case of the example 3 shown in FIG. 12, a step portion is formed and tapered in an element height direction, thereby a tapered ΔT portion may be produced. FIG. 13(d) shows a step of depositing a second inorganic insulating film 100b. For the second inorganic insulating film 100b, for example, an oxide or a nitride of Al, Si, Ta, Ti and the like may be used, which has the same processing rate as a lower, inorganic insulating film 100a in a processing method of an ion milling method, an RIE method, and an RIM method, but may have a high selective processing rate compared with the film 100a, for example, by changing a main processing gas to a chlorine-based gas or fluorine-based gas in the RIE (Reactive Ion Etching) method and the RIM (Reactive Ion Milling) method.

Figure 14:
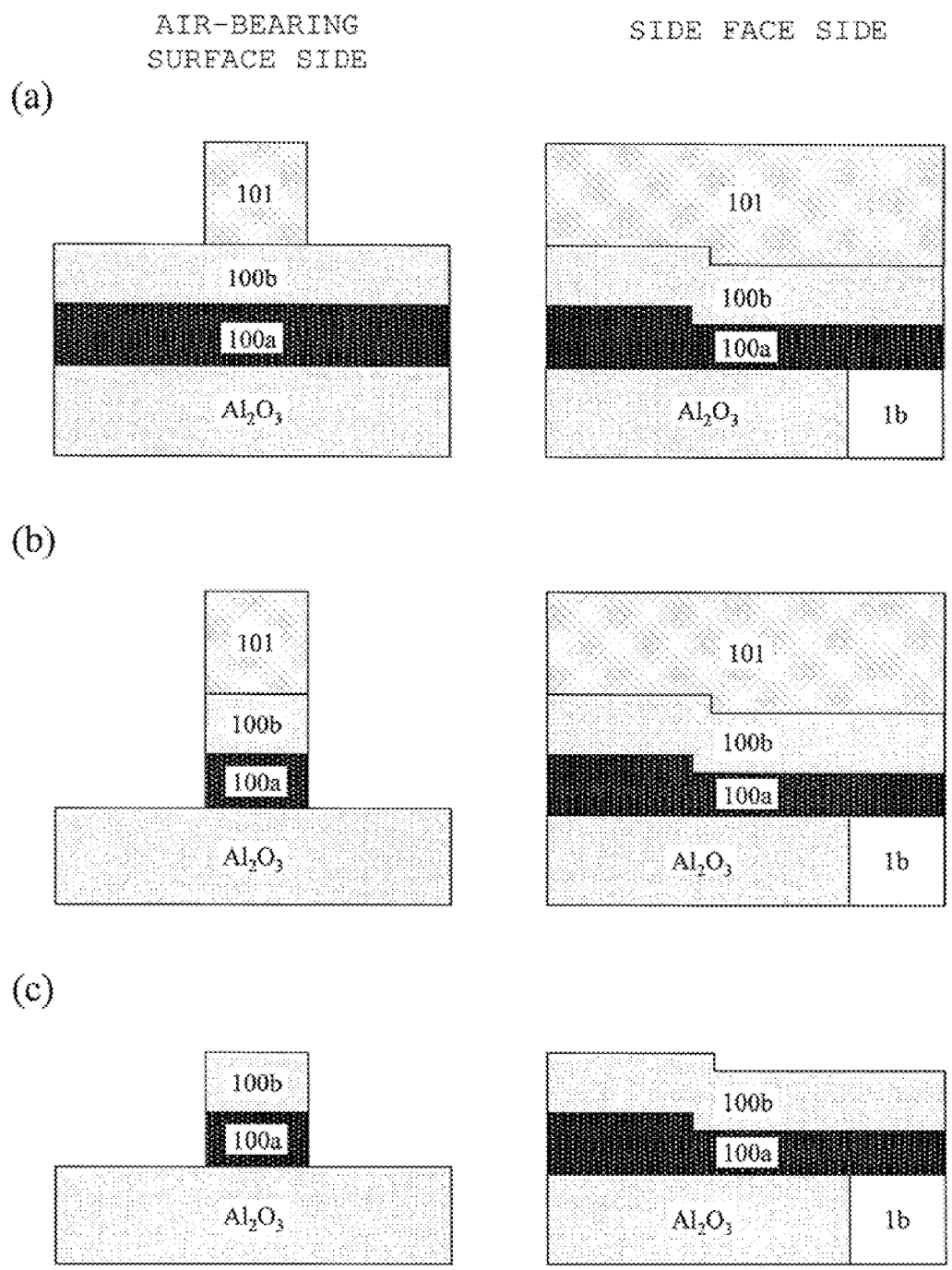
FIG. 14 includes manufacturing process views showing an example of the method of manufacturing a magnetic recording head, according to one embodiment.
Figure 25:
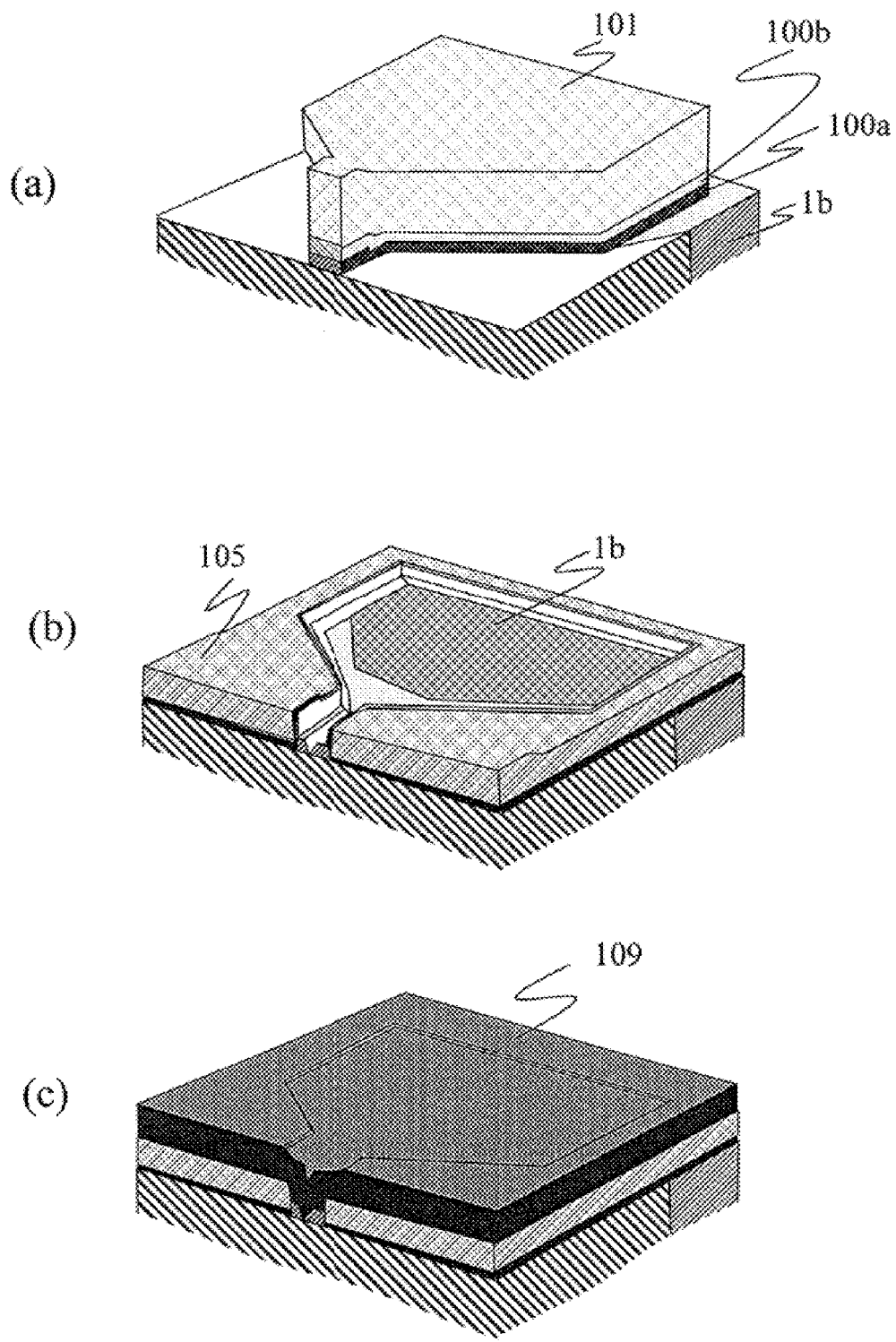
FIG. 25 includes perspective views of a middle process showing an example of the method of manufacturing a magnetic recording head, according to one embodiment.

FIG. 14 shows a process of etching the inorganic insulating film to form a rectangular pedestal 100 for cutting a groove, according to one embodiment. The rectangular pedestal 100 refers to a structure of a nonmagnetic material, which has the same pattern as that of the main pole 1a, but is wide in a width direction and has a rectangular section shape, and a function of supporting a magnetic body to be the main pole 1a, and has a function of defining restrictive positions of side shields 32 and the main pole 1a. FIG. 14(a) shows a step of depositing a second inorganic insulating film 100b, and then forming a resist pattern 104. As the resist pattern 104, a pattern is formed, which has the same profile as that of the main pole 1a, and is wide in a track direction. FIG. 14(b) shows a state where the inorganic insulating films 100a and 100b are etched into a rectangular shape with the resist pattern 104 as a mask. In this step, a general configuration is as shown in FIG. 25(a). The rectangular pedestal 100 may be formed into an inverted trapezoidal profile having the same bevel angle as the main pole 1a. FIG. 14(c) shows a state where the resist pattern 104 is removed.

Figure 15:
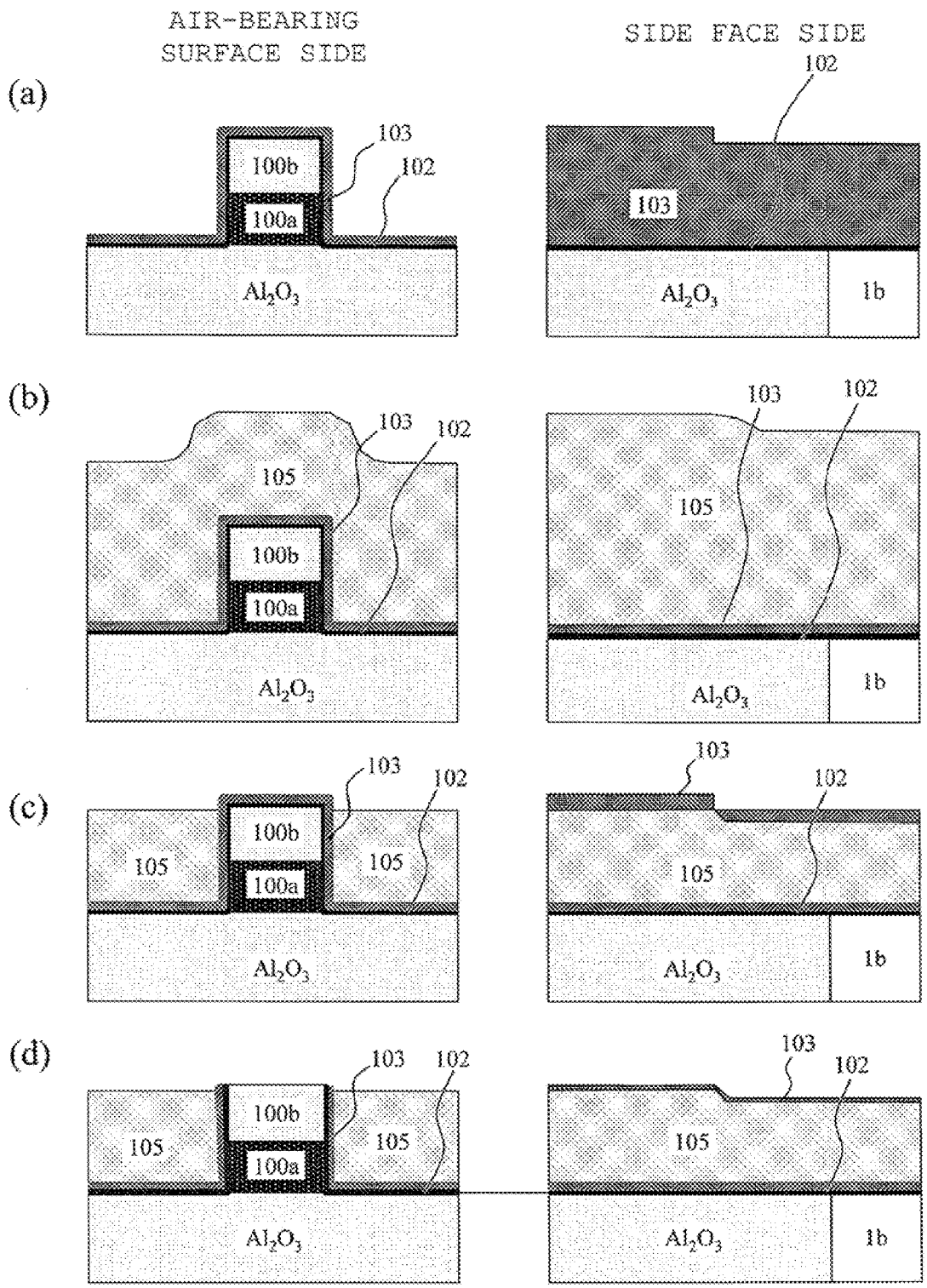
FIG. 15 includes manufacturing process views showing an example of the method of manufacturing a magnetic recording head, according to one embodiment.

FIG. 15 shows a step of sequentially depositing an electrode layer 102 for forming each side shield 32 and a protective film 103 for protecting each side face of the rectangular pedestal on each side face of the rectangular pedestal 100, a step of coating organic resin 105 over the whole surface, and a step of etching the organic resin 105 until a top of the rectangular pedestal 100 is exposed, according to one embodiment.

FIG. 15(a) shows a state where the electrode layer 102 for magnetic plating of each side shield 32 and the protective film 103 are sequentially deposited in a manner of covering the rectangular pedestal 100. For the electrode layer 102 for plating, for example, a single-layer film or a stacked film of a nonmagnetic metal such as Cr, NiCr, Rh, Mo, Nb and Au, or a single-layer film or a stacked film of a magnetic material including at least two elements of Co, Ni and Fe can be used. For the protective film 103, for example, a single-layer film or a stacked film of Cr and NiCr may be used to prevent oxidation of the electrode layer 102 for plating, and prevent processing broadening in a track direction of the pedestal 100 being processed in a rectangular shape, the film being good in adhesion with a resist or the organic resin 105 such as imide resin used in later steps, and being able to be removed by wet etching. FIG. 15(b) shows a state where a layer of the organic resin 105 is formed over the whole surface of the substrate by spin coating.

FIG. 15(c) shows a state where the organic resin 105 is etched by the RIM (Reactive Ion Milling) method until the top of the rectangular pedestal 100 is exposed. In the RIM method for the resist or the organic resin 105 such as imide resin, ion milling was performed using a single gas or a mixed gas including oxygen-based gas such as $O_2$, CO or $CO_2$ as a main gas and Ar gas mixed with the main gas until the film of a top of the rectangular pedestal 100 was exposed. FIG. 15(d) shows a state where the protective film 103 exposed on the top of the rectangular pedestal 100 and the electrode layer 102 for magnetic plating are removed by etching using an ion milling method, so that a top of the second inorganic insulating layer 100b of the rectangular pedestal 100 is exposed. The reason why the organic resin 105 is set to the same height as that of the rectangular pedestal 100 is because if the organic resin 105 is higher than a pattern of the rectangular pedestal 100, a shadow effect occurs, which obstructs ion injection in the ion milling method, causing a phenomenon that processing does not reach a bottom of the rectangular pedestal 100.

Figure 16:
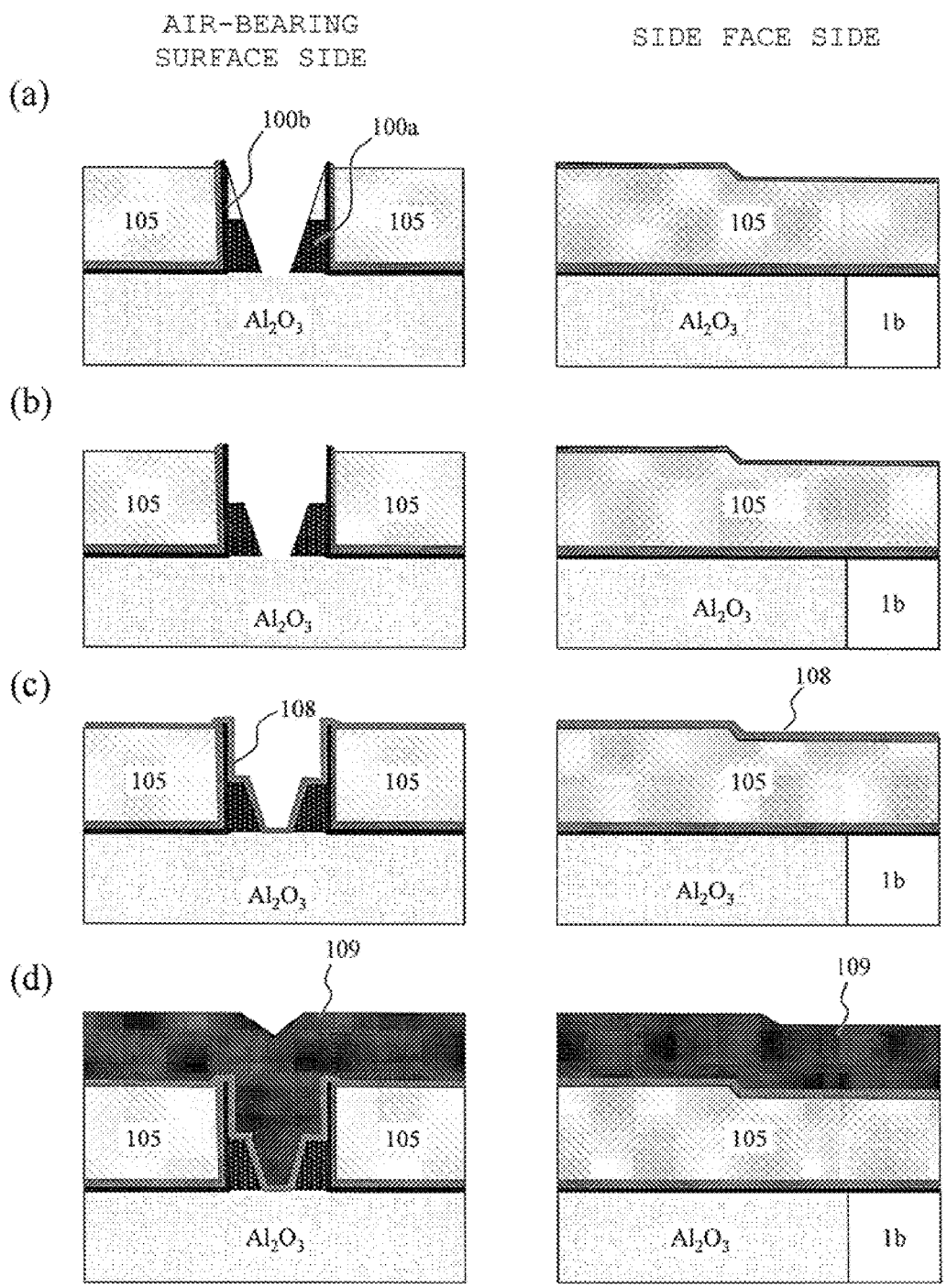
FIG. 16 includes manufacturing process views showing an example of the method of manufacturing a magnetic recording head, according to one embodiment.

FIG. 16 shows schematic views of a manufacturing process of integrally forming the roof magnetic layer 5, according to one embodiment, with the main pole 1a. FIG. 16 shows a step of forming a groove having an inverted trapezoidal profile in the rectangular pedestal 100, a step of expanding the groove in the rectangular pedestal 100, and a step of filling the groove in the rectangular pedestal 100 with a magnetic plating film 109.

FIG. 16(a) shows a state where the inorganic insulating layers 100a and 100b of the rectangular pedestal 100 are subjected to grooving by the RIM method to have a groove having an inverted trapezoidal profile respectively. In the RIM method, ion milling was performed using a fluorine-based gas such as $CHF_3$, $CF_4$ or $C_4F_8$ as a main gas and Ar gas mixed to the fluorine-based gas while depositing C that hinders the processing on a processed surface, thereby a groove having an inverted trapezoidal profile can be formed. FIG. 16(b) shows a state where the upper inorganic insulating layer 100b is processed so as to expand groove width. In this step, a general configuration is as shown in FIG. 25(b). The inorganic insulating layer 100b can be processed at a high selective processing rate compared with the inorganic insulating layer 100a by the RIE (Reactive Ion Etching) method, for example, by using a chlorine-based gas or a fluorine-based gas as a main processing gas, so that etching can be stopped at a boundary to the inorganic insulating layer 100a. In the case of the example 2 shown in FIG. 11, in which the width w2 on the trailing side of the magnetic layer added on each side face on the trailing side of the roof magnetic layer 5 and width w1 on the leading side of the magnetic layer are in a relationship of w1<w2, such a groove may be easily produced by changing a processing condition of RIE (voltage, current, gas flow rate and the like). FIG. 16(c) shows a state where an electrode layer 108 is deposited for filling the groove in the rectangular pedestal 100 with the magnetic plating film 109. For the electrode layer 108, a nonmagnetic material may be used, or a magnetic material, for example, a single-layer film or a stacked film of a magnetic material including at least two elements of Co, Ni and Fe may be used. FIG. 16(d) shows a state where the magnetic film 109 is plated using an electroplating method. In this step, a general configuration is as shown in FIG. 25(c). In the case of using the electroplating method, for example, a single-layer plating film or a mixed plating film of a magnetic material, which has a high saturation magnetic-flux density Bs, including at least two elements of Co, Ni and Fe may be used.

Figure 17:
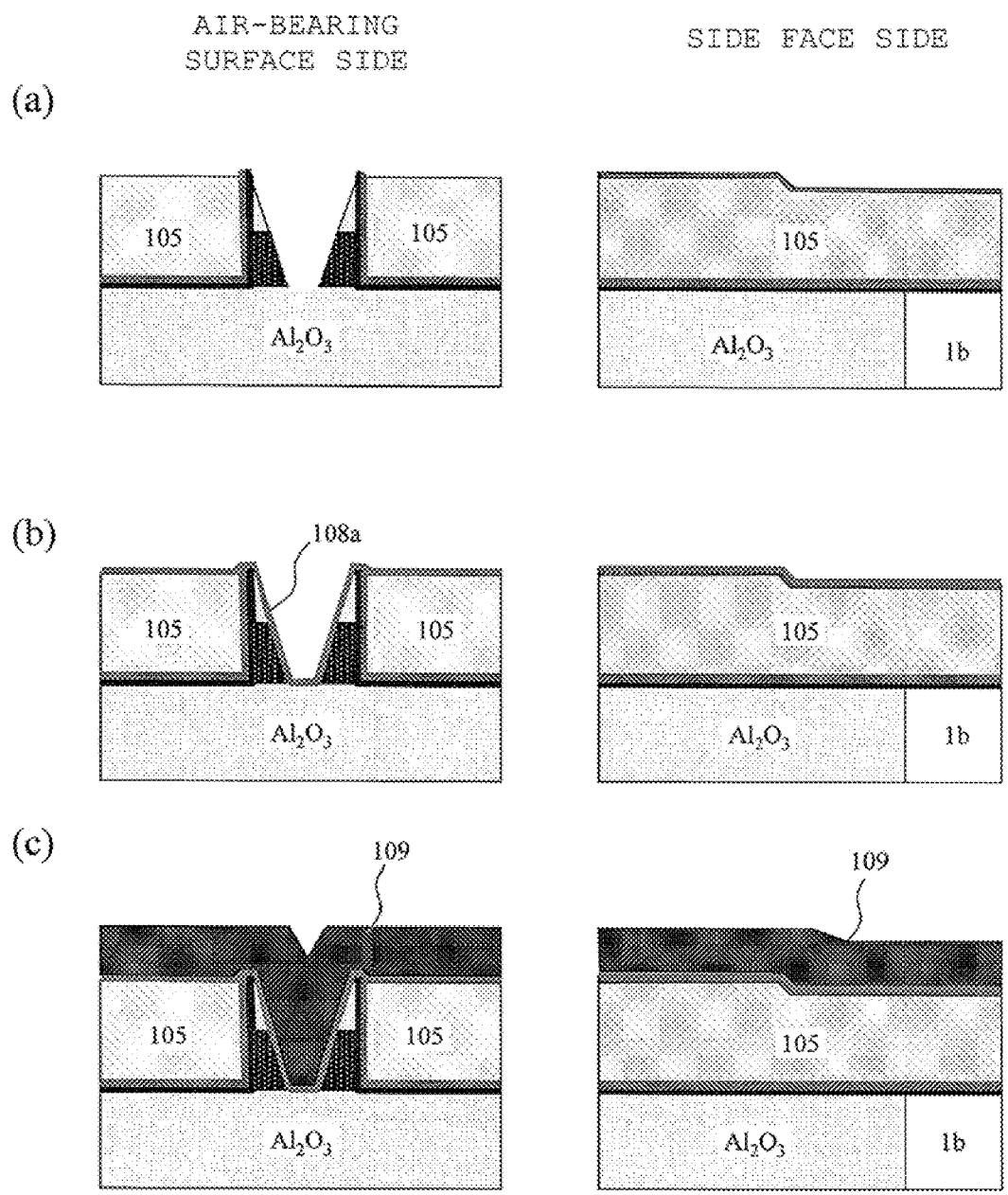
FIG. 17 includes manufacturing process views showing an example (separated configuration) of the method of manufacturing a magnetic recording head, according to one embodiment.
Figure 18:
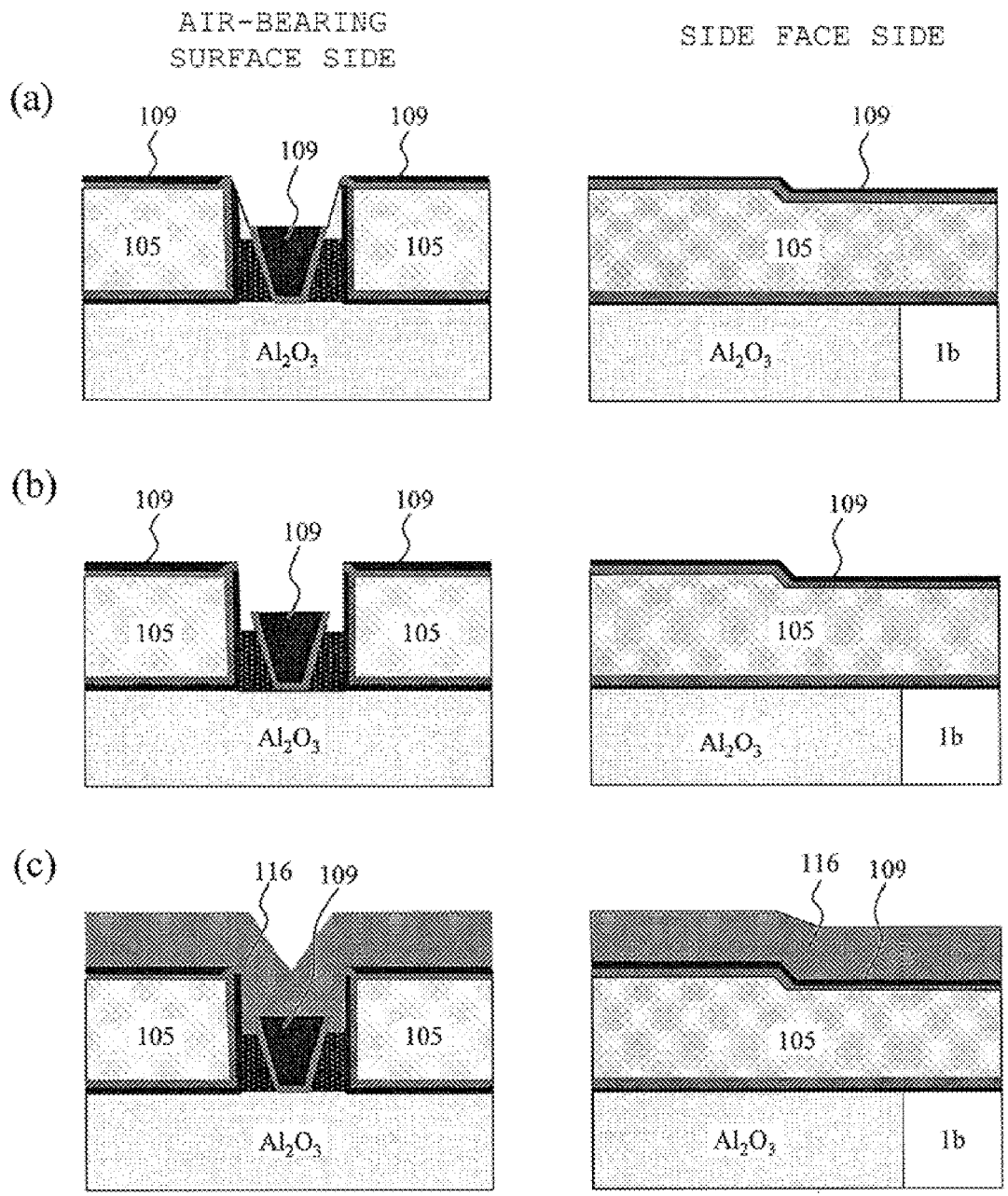
FIG. 18 includes manufacturing process views showing an example (another separated configuration) of the method of manufacturing a magnetic recording head, according to one embodiment.

FIGS. 17 and 18 show schematic views of a manufacturing process of an example, in which the roof magnetic layer 5 and the main pole 1a are separately formed.

FIG. 17 shows a step of forming a groove having an inverted trapezoidal profile in the rectangular pedestal 100, and a step of filling the groove in the rectangular pedestal 100 with the magnetic plating film 109, according to one embodiment. FIG. 17(a) shows a state where the inorganic insulating films 100a and 100b of the rectangular pedestal 100 are processed to form a groove having an inverted trapezoidal profile. In this step, the same production step as in FIG. 16(a) is used. FIG. 17(b) shows a state where an electrode layer 108a for electroplating is deposited in the groove processed into an inverted trapezoidal profile. For the electrode layer 108a, a nonmagnetic material may be used, or a magnetic material, for example, a single-layer film or a stacked film of a magnetic material including at least two elements of Co, Ni and Fe may be used. FIG. 17(e) shows a state where the magnetic film 109 is plated using an electroplating method. In the case of using the electroplating method, for example, a single-layer plating film or a mixed plating film of a magnetic material, which has high saturation magnetic-flux density Bs, including at least two elements of Co, Ni and Fe may be used.

FIG. 18 shows a schematic view of a manufacturing process of an example, in which the roof magnetic layer 5 according to one embodiment of the invention and the main pole 1a are separately formed. FIG. 18 shows a step of removing the magnetic plating film 109 to a height on a trailing side of an ABS of the main pole 1a, and a production step of depositing a magnetic film 116 having a saturation magnetic flux density Bs being equal to or higher than the saturation magnetic flux density Bs of the main pole 1a. FIG. 18(a) shows a state where the magnetic plating film 109 is removed using the ion milling method to the height on the trailing side of the ABS of the main pole 1a. The magnetic plating film 109 can be etched with a rate about two times as high as the etching rate of the inorganic insulating layer 100b by using Ar gas as a main gas of the ion milling method. FIG. 18(b) shows a state where the inorganic insulating layer 100b is processed by the RIE (Reactive Ion Etching) method, for example, using a chlorine-based gas or a fluorine-based gas as a main processing gas so that groove width is expanded. FIG. 18(c) shows a state where the magnetic film 116 is stacked in the groove in the rectangular pedestal 100. The stacked film 116 may be formed using a sputtering method, and a single-layer film or a stacked film of a magnetic material, which has a high saturation magnetic-flux density Bs equal to or higher than the saturation magnetic-flux density Bs of the main pole 1a, including at least two elements of Co, Ni and Fe may be used for the film 116.

Each of the manufacturing methods of FIGS. 17 and 18 may be used to separately form the roof magnetic layer 5 (a magnetic film overhanging in a manner of wrapping a trailing side of a flare portion of the main pole from a throat height portion thereof) and the main pole 1a.

Figure 19:
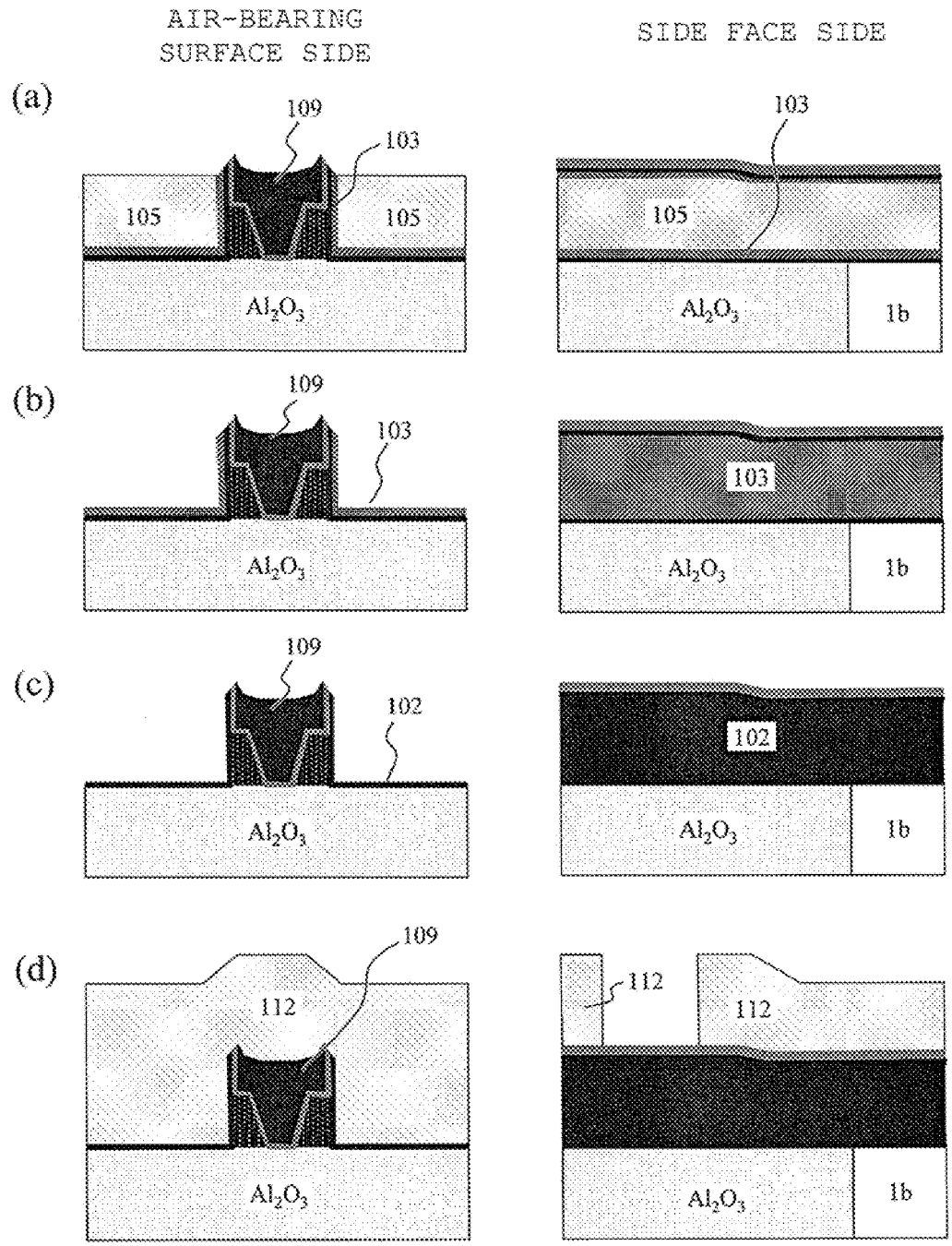
FIG. 19 includes manufacturing process views showing an example of the method of manufacturing a magnetic recording head, according to one embodiment.

FIG. 19 shows a step of removing an unnecessary magnetic plating film, a step of removing a protective film 103 on each side face of the rectangular pedestal 100 to expose the electrode layer 102 for forming each side shield layer 32, and a step of forming a resist pattern 112, according to one embodiment.

FIG. 19(a) shows a state where an unnecessary magnetic film 109 is removed using the ion milling method, according to one embodiment. In the ion milling method, while Ar is used as a main gas, and an incident angle of 55° to 70°, which is a low angle with respect to a substrate, is used, so that etching of the magnetic film 109 in the groove of the rectangular pedestal 100 is reduced, a magnetic film 109 in the periphery is removed, thereby the organic resin 105 on each side face of the rectangular pedestal 100 is exposed. FIG. 19(b) shows a state where the organic resin 105 is removed. On each side face of the rectangular pedestal 100, a surface of the protective film 103 is exposed, which was deposited to prevent oxidation of the electrode layer 102 for plating deposited in the previous production step of the shield 32 to be provided on each side face of the main pole 1a, and prevent processing broadening of the pedestal 100 being processed into a rectangular profile.

FIG. 19(c) shows a state where the protective film 103 is removed, so that the electrode layer 102 for plating is exposed for forming the shield 32 to be provided on each side face of the main pole 1a, according to one embodiment. For the protective film 103, for example, a single-layer film or a stacked film of Cr and NiCr is preferably used, which can be removed by wet etching. FIG. 19(d) shows a state where an oxide film is removed from a surface of the electrode layer 102 for plating by lightly using the ion milling method, and then a resist pattern 112 is formed for each shield 32 to be provided on each side face of the magnetic pole 1a.

Figure 20:
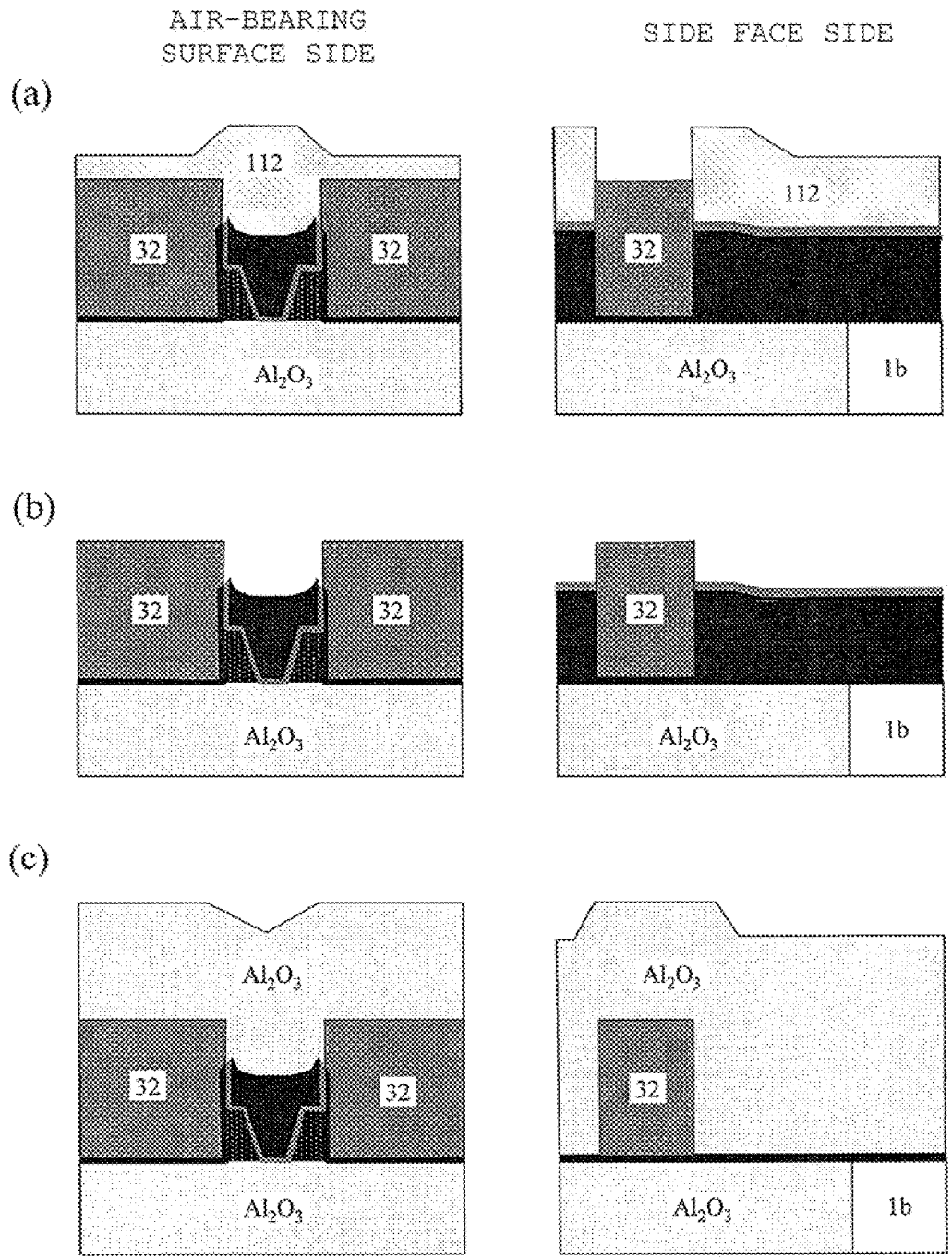
FIG. 20 includes manufacturing process views showing an example of the method of manufacturing a magnetic recording head, according to one embodiment.
Figure 26:
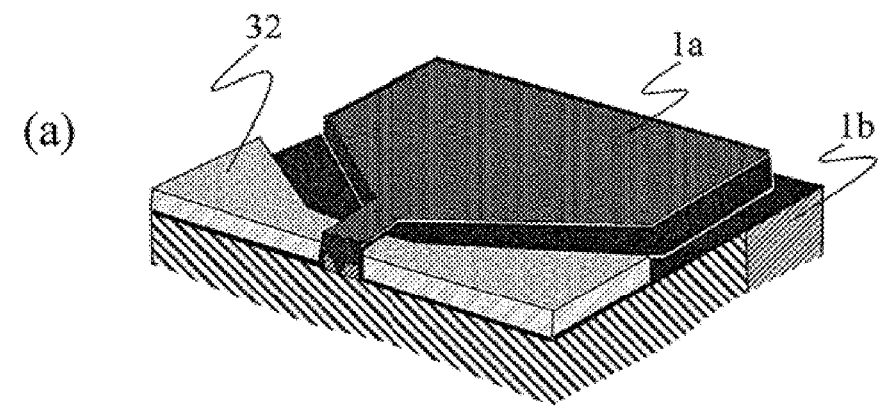
FIG. 26 includes perspective views of a middle process showing an example of the method of manufacturing a magnetic recording head, according to one embodiment.
Figure 26:
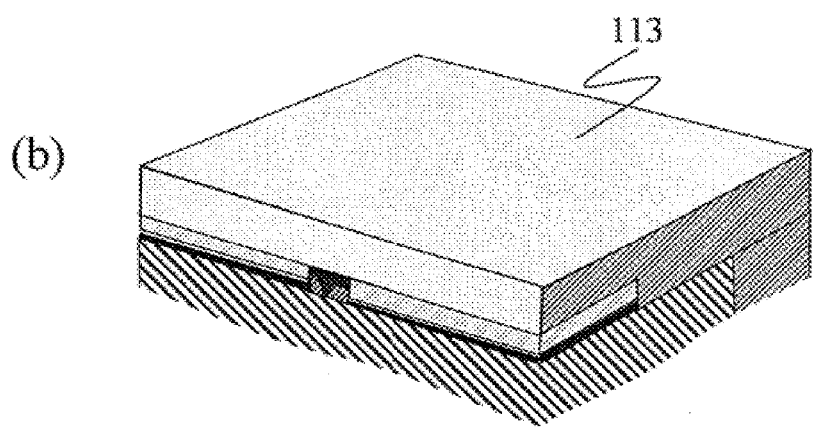
Figure 26:
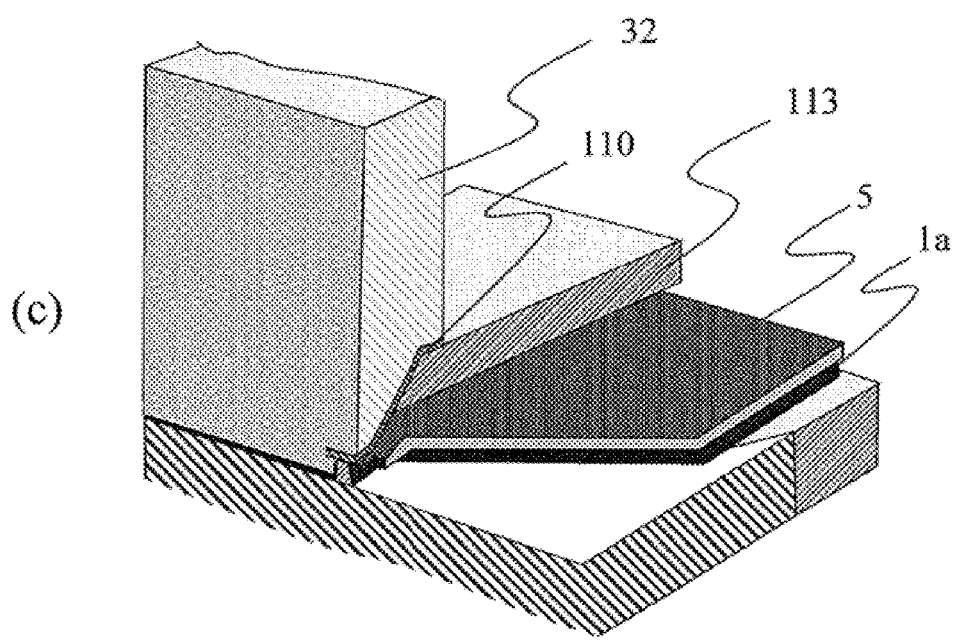

FIG. 20 shows a step of forming each side shield layer as the shield 32 provided on each side face of the main pole 1a by magnetic plating using the resist pattern 112, and a preceding step for flattening a magnetic film, according to one embodiment. FIG. 20(a) shows a state where the shield 32 provided on each side face of the main pole 1a is formed by an electroplating method. In this step, a general configuration is as shown in FIG. 26(a). For the shield 32, for example, a magnetic plating film of a magnetic material including at least two elements of Co, Ni and Fe is used. FIG. 20(b) shows a state where the resist pattern 112 is removed. FIG. 20(c) shows a state where an $Al_2O_3$ film is deposited on the whole surface as a preceding step for flattening the magnetic film using a CMP (Chemical Mechanical Polishing) method.

Figure 21:
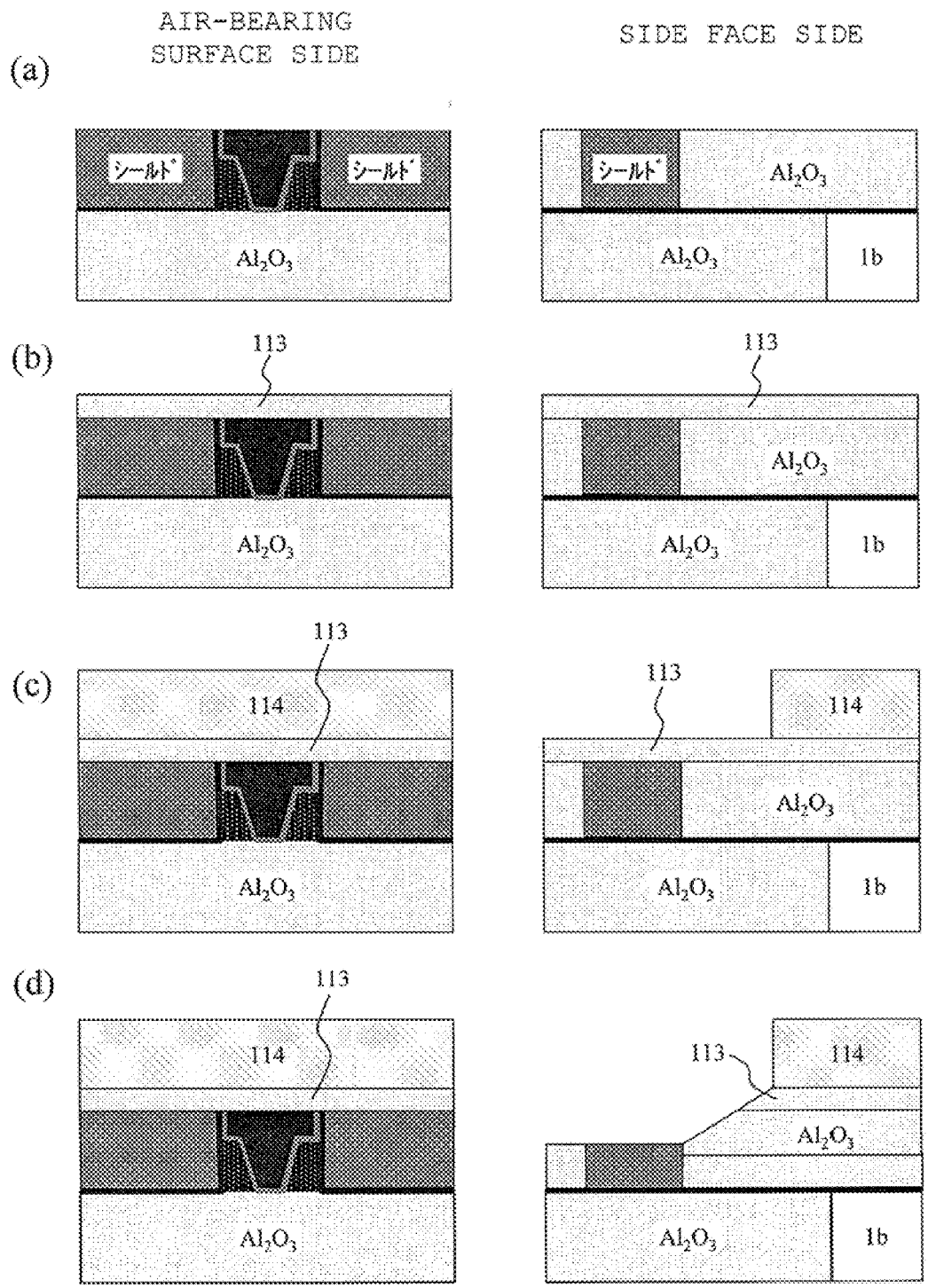
FIG. 21 includes manufacturing process views showing an example of the method of manufacturing a magnetic recording head, according to one embodiment.

FIG. 21 shows a step of depositing an inorganic insulating film 113 on the flattened substrate, and forming a resist pattern 114, and a step of etching the inorganic insulating film 113, the shield 32 on each side face of the main pole, the rectangular pedestal 100, and the magnetic layer 109 in the groove with the resist pattern 114 as a mask, according to one embodiment. FIG. 21(a) shows a state where respective surfaces of the rectangular pedestal 100, the magnetic layer 109 in the groove, the shield 32 on each side face of the main pole, and the $Al_2O_3$ film are flattened by the CMP method, and thus exposed on the same plane. While remaining thickness of each region may be determined by the CMP method for flattening, the remaining thickness may be determined by concurrently using the ion milling method. In FIG. 21(b), the inorganic insulating film 113 is deposited on the flattened substrate. In this step, a general configuration is as shown in FIG. 26(b). For the inorganic insulating film 113, for example, an oxide or a nitride of Al, Si, Ta or Ti may be used. FIG. 21(c) shows a state where a resist pattern 114 is formed on the inorganic insulating film. FIG. 21(d) shows a state where the inorganic insulating film 113, the shield 32 on each side face of the main pole, the rectangular pedestal 100, and the magnetic layer 109 in the groove are processed by the ion milling method with the resist pattern 114 as a mask. An ion incident angle in the ion milling is set to 45° to 60° so that a shape is formed by processing, which is tapered from a portion near the resist mask to an ABS.

Figure 22:
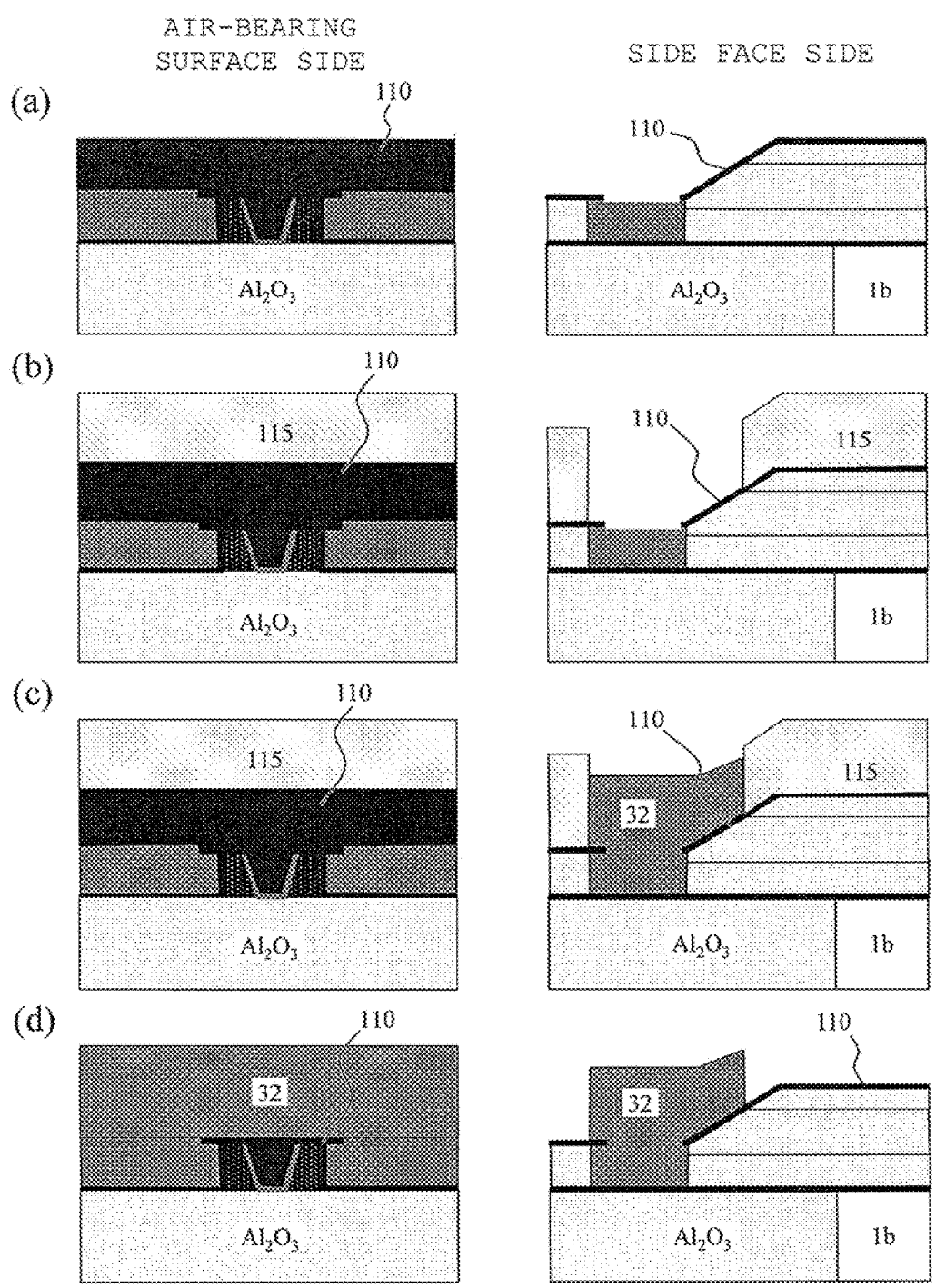
FIG. 22 includes manufacturing process views showing an example of the method of manufacturing a magnetic recording head, according to one embodiment.
Figure 23:
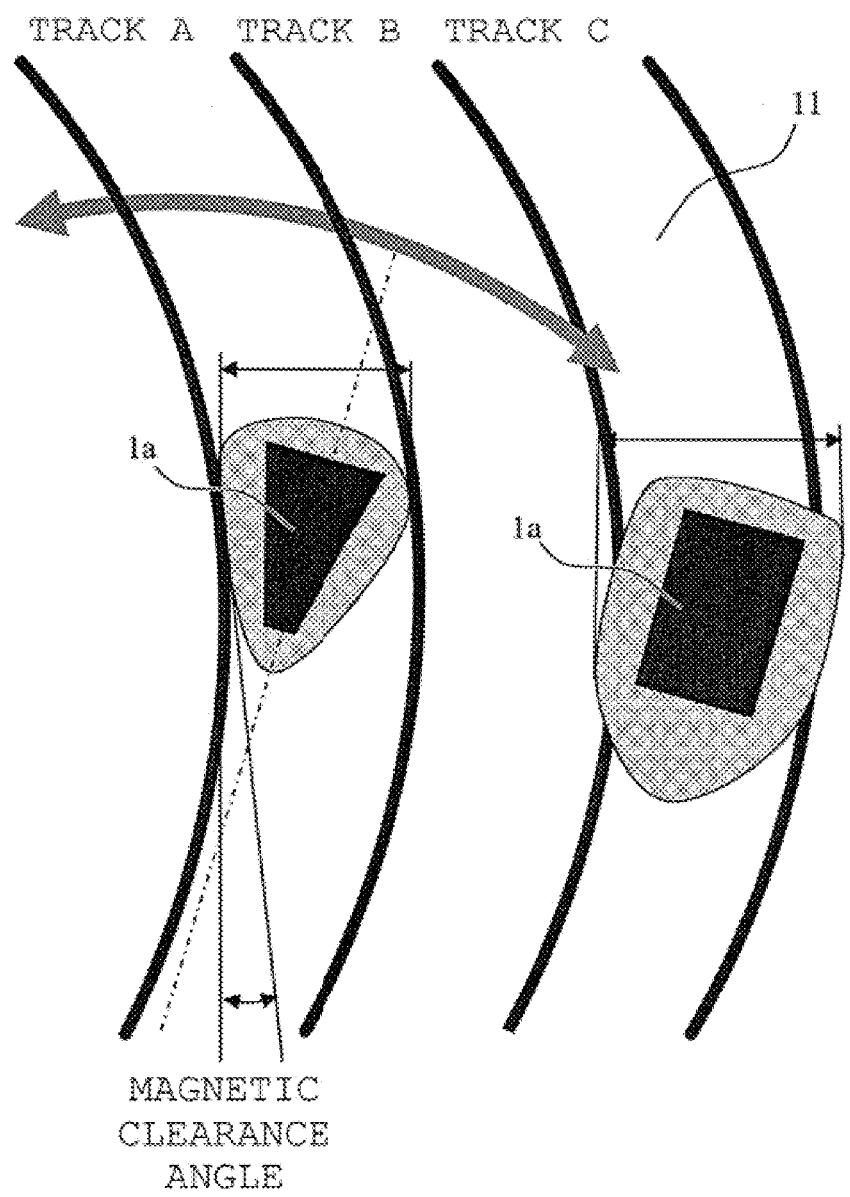
FIG. 23 includes a conceptual view showing a position of a magnetic recording head with respect to a magnetic recording medium, according to one embodiment.

FIG. 22 shows a step of depositing a gap film 110 for a shield 32 on the trailing side, a step of forming a resist pattern 115, and a step of forming a magnetic plating layer for the shield on the trailing side with the resist pattern 115 as a mask, according to one embodiment. FIG. 22(a) shows a state where the resist pattern 114 is removed, then the gap film 110 is deposited, and then part of the gap film 110 on a top of each shield 32 on each side face of the main pole is removed by etching. Since the gap film 110 works even as an electrode layer for magnetic plating of the shield 32 on the trailing side of the main pole 1a, for example, a single-layer film or a stacked film of a nonmagnetic metal such as Cr, NiCr, Rh, Mo, Nb and Au is used for the gap film, thereby the film may even have a function of the gap layer. To match a function of the shield 32 on each side face of the main pole with a function of the shield 32 on the trailing side, part of the gap film 110 is removed by etching for magnetic coupling between the shields. FIG. 22(b) shows a state where the resist pattern 115 for the shield 32 on the trailing side is formed. FIG. 22(c) shows a state where magnetic plating of the shield 32 on the trailing side of the main pole 1a is performed by an electroplating method. In this step, in the case that the shield and the inorganic insulating layer are partially removed, the periphery of the main pole 1a is generally as shown in FIG. 26(c). For the shield 32 on the trailing side of the main pole 1a, the same magnetic film as that of the shield 32 on each side face of the main pole 1a is used. FIG. 22(d) shows a state where the resist pattern 115 is removed. According to a manufacturing process Of one embodiment of the invention, the main pole 1a is added with a magnetic film overhanging in a track direction on the trailing side and thus surrounded by the shields from three sides via the nonmagnetic layer.

As described hereinbefore, the perpendicular magnetic recording head, according to one embodiment, is a perpendicular-recording-type magnetic head mounted with a single-pole recording/reproducing head having a recording head including a main pole and an auxiliary pole, and a magnetoresistive effect read element. While an embodiment on the periphery of the main pole 1a was described, the invention is not limited to the embodiment, and as long as the magnetic head has a structure where an auxiliary electrode having a width larger than geometrical track width of a writing pole is provided on both side faces and a top on a trailing side of a flare portion spaced in an element height direction from a throat height portion spaced in the element height direction from an ABS without expanding the geometrical track width of an ABS of a writing pole of a recording head, a manufacturing method, material, thickness, a shape and the like may be altered or modified.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording head, comprising:
a main pole having:
a throat height portion that defines a recording track width by a surface facing a recording medium; and
a flare portion that is integrally formed with the throat height portion and gradually increases in width in an element height direction;
magnetic shields disposed via a nonmagnetic layer on a trailing side of the main pole and on both sides in a track width direction of the main pole; and
a magnetic film formed on:
a throat height portion near the rear in the element height direction with respect to an ABS, and
the flare portion which overhangs in a track width direction on the trailing side of the main pole,
wherein the magnetic film has a region in which a thickness of the magnetic film is gradually increased in the element height direction.

2. The magnetic recording head according to claim 1, wherein the magnetic film is provided on a throat height portion retracted by at least 10 nm from the ABS in the element height direction.

3. The magnetic recording head according to claim 1, wherein the magnetic film overhangs on a trailing side of the throat height portion and on a trailing side of the flare portion.

4. The magnetic recording head according to claim 1, wherein the magnetic film has a length in a depth direction on the throat height portion and on the flare portion that is less than ½ of a thickness of the magnetic film positioned closest to the ABS of the main pole.

5. The magnetic recording head according to claim 1, wherein:
the main pole and the magnetic film have structural characteristics of being formed in different processes, and
the magnetic film wraps around the main pole from a trailing side and from side faces on the trailing side.

6. The magnetic recording head according to claim 5, wherein the magnetic film has a saturation magnetic flux density equal to or higher than a saturation magnetic flux density of the main pole.

7. The magnetic recording head according to claim 5, wherein the magnetic film includes at least one of: a NiFe alloy, a CoFe alloy, and a CoNiFe alloy.

8. The magnetic recording head according to claim 5, wherein the magnetic film is formed using a physical deposition method and a chemical formation method.

9. A system, comprising:
a magnetic recording medium;
at least one magnetic recording head as recited in claim 1 for reading from and/or writing to the magnetic recording medium; and
a control unit coupled to the magnetic recording head for controlling operation of the magnetic recording head.

10. A magnetic recording head, comprising:
a main pole having:
a throat height portion that defines a recording track width by a surface facing a recording medium: and
a flare portion that is integrally formed with the throat height portion and gradually increases in width in an element height direction:
magnetic shields disposed via a nonmagnetic layer on a trailing side of the main pole and on both sides in a track width direction of the main pole: and
a magnetic film formed on:
a throat height portion near the rear in the element height direction with respect to an ABS, and
the flare portion which overhangs in a track width direction on the trailing side of the main pole, wherein the magnetic film, which overhangs on the trailing side of the throat height of the main pole, has an overhanging width of ½ or less of a track width in a track direction.

11. A system, comprising:
a magnetic recording medium;
at least one magnetic recording head as recited in claim 10 for reading from and/or writing to the magnetic recording medium; and
a control unit coupled to the magnetic recording head for controlling operation of the magnetic recording head.

12. A method of manufacturing a magnetic recording head, the method comprising:
forming a first inorganic insulating film on a substrate, the first inorganic layer having a flattened top so that a top of a yoke portion of a main pole is exposed, the main pole having a throat height portion that defines a recording track width by a facing surface facing a recording medium and a flare portion that is integrally formed with the throat height portion and gradually increased in width in an element height direction;
forming a step in the inorganic insulating film;
forming a second inorganic insulating film on the stepped first inorganic insulating film;
etching the second inorganic insulating film to form a rectangular pedestal for cutting a groove;
sequentially depositing an electrode layer for forming magnetic side shields disposed on both sides of the main pole in a track width direction of the main pole;
sequentially depositing a protective film for protecting each side face of the rectangular pedestal on each side face of the rectangular pedestal;
coating organic resin over each surface;
etching the organic resin until the rectangular pedestal is exposed;
forming a groove having an inverted trapezoidal profile in the rectangular pedestal;
expanding the groove in the rectangular pedestal;
filling the groove in the rectangular pedestal with a magnetic plating film;
removing any extraneous magnetic plating film above the groove;
removing the protective film on each side face of the rectangular pedestal to expose the electrode layer for forming each magnetic side shield layer;
forming each magnetic side shield layer by magnetic plating;
flattening the magnetic plating;
depositing an inorganic insulating film on a substrate, which is flattened so that surfaces of respective regions are exposed;
forming a resist pattern on the inorganic insulating film;
etching the inorganic insulating film, each magnetic side shield layer, the rectangular pedestal, and the magnetic layer in the groove with the resist pattern as a mask;
depositing an electrode layer for forming a trailing magnetic shield on a trailing side of the main pole; and
forming a magnetic plating layer for forming the trailing magnetic shield which overhangs in a track width direction on the trailing side of the main pole and on a throat height portion at a back of the main pole in the element height direction with respect to an ABS.

13. The method according to claim 12, wherein the magnetic plating layer includes at least one of: a NiFe alloy, a CoFe alloy, and a CoNiFe alloy.

14. The method according to claim 12, wherein the trailing magnetic shield has a saturation magnetic flux density equal to or higher than a saturation magnetic flux density of the main pole.

15. The method according to claim 12, wherein the side magnetic shields have a saturation magnetic flux density equal to or higher than a saturation magnetic flux density of the main pole.

16. The method according to claim 12, wherein the trailing magnetic shield is retracted by at least 10 nm from the ABS in the element height direction.

17. The method according to claim 12, wherein the trailing magnetic shield overhangs on a trailing side of the throat height portion of the main pole and the side magnetic shields overhang on a trailing side of the flare portion of the main pole.

* * * * *

UNITED STATES PATENT AND TRADEMARK OFFICE
CERTIFICATE OF CORRECTION

| | | |
|---|---|---|
| PATENT NO. | : 8,335,051 B2 | Page 1 of 1 |
| APPLICATION NO. | : 12/636667 | |
| DATED | : December 18, 2012 | |
| INVENTOR(S) | : Nunokawa et al. | |

It is certified that error appears in the above-identified patent and that said Letters Patent is hereby corrected as shown below:

On the Title page Item 57:

In line 5 of the Abstract, replace "a." with --a--.

In the specification:

Col. 1, line 47 replace "Bevel" with --bevel--;

Col. 19, line 34 replace "Of" with --of--.

Signed and Sealed this
Twenty-first Day of May, 2013

Teresa Stanek Rea
*Acting Director of the United States Patent and Trademark Office*